United States Patent
Uno et al.

(10) Patent No.: US 10,358,289 B2
(45) Date of Patent: Jul. 23, 2019

(54) STORAGE CABINET

(71) Applicant: SATO HOLDINGS KABUSHIKI KAISHA, Tokyo (JP)

(72) Inventors: Yoshiaki Uno, Singapore (SG); Yusita Kasdani, Singapore (SG)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/565,872

(22) PCT Filed: Apr. 28, 2016

(86) PCT No.: PCT/JP2016/063334
§ 371 (c)(1),
(2) Date: Oct. 11, 2017

(87) PCT Pub. No.: WO2016/175276
PCT Pub. Date: Nov. 3, 2016

(65) Prior Publication Data
US 2018/0093830 A1    Apr. 5, 2018

(30) Foreign Application Priority Data
Apr. 28, 2015    (JP) ................................ 2015-091123

(51) Int. Cl.
*G06K 7/10*    (2006.01)
*G07C 9/00*    (2006.01)
(Continued)

(52) U.S. Cl.
CPC ........... *B65G 1/1371* (2013.01); *B65G 1/137* (2013.01); *G06K 17/00* (2013.01); *G06Q 10/087* (2013.01);
(Continued)

(58) Field of Classification Search
CPC .... B65G 1/1371; B65G 1/137; G06Q 10/087; G06K 17/00; G06K 7/10297; G07C 9/00158
See application file for complete search history.

(56) References Cited

U.S. PATENT DOCUMENTS

2006/0022827 A1*    2/2006    Higham ................. G06K 17/00
                                                    340/572.1
2006/0192001 A1*    8/2006    Shaffer ................ G06Q 10/087
                                                    235/385
(Continued)

FOREIGN PATENT DOCUMENTS

JP    10-316210 A    12/1998
JP    2002-119577 A    4/2002
(Continued)

*Primary Examiner* — Sonji N Johnson
(74) *Attorney, Agent, or Firm* — Foley & Lardner LLP

(57) ABSTRACT

A storage cabinet according to an embodiment stores a plurality of items includes a first reader configured to read item information recorded in a first tag of all items stored in a housing, when a door is in a closed state, and judges whether an item exists in the housing that is past a reference date on a basis of an expiration date of the item, based on a reading result of the first reader. If it is judged that an item exists in the housing that is past the reference date, a first mode or a second mode is selected based on an operation of a user. The first mode is a mode in which retrieval of an item other than an item having a period of time to an expiration date which is the shortest among items of the identical item code, is restricted. The second mode is a mode in which retrieval of an item other than an expired item is restricted.

14 Claims, 20 Drawing Sheets

(51) Int. Cl.
*B65G 1/137* (2006.01)
*G06K 17/00* (2006.01)
*G06Q 10/08* (2012.01)

(52) U.S. Cl.
CPC ..... *G06K 7/10297* (2013.01); *G07C 9/00158* (2013.01)

(56) References Cited

U.S. PATENT DOCUMENTS

| | | |
|---|---|---|
| 2007/0150381 A1 | 6/2007 | Pippia et al. |
| 2014/0138440 A1 | 5/2014 | D'Ambrosio et al. |
| 2017/0053230 A1 | 2/2017 | D'Ambrosio et al. |

FOREIGN PATENT DOCUMENTS

| | | |
|---|---|---|
| JP | 2005-082381 A | 3/2005 |
| JP | 2014-037894 A | 2/2014 |
| WO | WO 2006/093701 A1 | 9/2006 |

\* cited by examiner

| USER ID | NAME | DEPARTMENT | POSITION | ...... |
|---------|------------|------------|----------|--------|
| 5029 | Taro Yamada | Sales | N/A | ...... |
| 5053 | Gary Koo | Sales | N/A | ...... |
| 5085 | Ken Suzuki | Sales | Manager | ...... |
| ⋮ | ⋮ | ⋮ | ⋮ | |

REGISTERED USER DATABASE 231

FIG.9

| ITEM CODE | ITEM DESCRIPTION | EXPIRATION DATE | LOT NUMBER |
|-----------|------------------|-----------------|------------|
| 0042 | aaaaa | 30/9/2015 | 1234567 |
| 0123 | bbbbb | 31/5/2015 | 2345671 |
| ⋮ | ⋮ | ⋮ | ⋮ |

INVENTORY DATABASE 232

| TOTAL QTY OF ITEM : 210 | | |
|---|---|---|
| ITEM DESCRIPTION | ITEM CODE | QTY |
| kkkkk | 0135 | 1 |
| aaaaa | 0042 | 7 |
| ppppp | 7240 | 3 |
| ⋮ | ⋮ | ⋮ |

TAP

G11

| ITEM DESCRIPTION : aaaaa | | |
|---|---|---|
| EXPIRATION DATE | LOT NUMBER | QTY |
| 30/12/2015 | 5841967 | 3 |
| 19/3/2015 | 3424153 | 2 |
| 14/10/2015 | 0120342 | 1 |
| 08/7/2015 | 9990123 | 1 |

(EXPIRED)

| PICK SCANNIG RESULT: OK |
|---|
| ITEM DESCRIPTION : bbbbb |
| ITEM CODE : 0123 |
| EXPIRATION DATE : 31/5/2015 |
| LOT NUMBER : 2345671 |
| |

| PLEASE REMOVE ITEM TO BE PICKED. ||
|---|---|
| ITEM DESCRIPTION | LOT NUMBER |
| ddddd | 0034125 |
| ccccc | 2387925 |
| ttttt | 8247123 |
|  |  |

FIG.20

STORAGE CABINET

TECHNICAL FIELD

The present invention relates to a storage cabinet that stores contents (items) such as products and goods.

BACKGROUND ART

A storage cabinet is known that manages contents (items) by using radio frequency identification (RFID) technology. The patent literature 1 for example describes that a radio frequency detector is attached to a food as an example of each of a single or a plurality of contents (items). The patent literature 1 describes that a storage cabinet instructs the detector to judge whether a condition value indicative of a condition of a food is above or below a threshold, and that the storage cabinet includes: a reader receiving the judgement result of the detector; and a determiner determining respective conditions of the single or the plurality of foods with reference to the judgement result received by the reader. Further, the patent literature 1 also describes that the reader may be an RFID reader receiving a signal from an RFID tag.

Meanwhile, a goods management system suggested in the patent literature 2 compares, information indicating a date of storing (or an expiration date for use) read from a RFID tag with regard to goods (item) that is recognized to have been retrieved from a storage cabinet, and information recorded in goods management information recording means and indicating respective dates of storing (or respective expiration dates for use) with regard to goods in the storage cabinet. The goods management system then notifies a person who has retrieved the goods from the storage cabinet, when a first-in-first-out method for the goods with respect to the storage cabinet is not followed. Further, the system compares the expiration date for use read from a RFID tag with regard to goods (item) that is recognized to have been retrieved from a storage cabinet, and a date managed by a computer (that is, a present date). The system then notifies a person who has retrieved the goods from the storage cabinet, when the system judges that the goods which have been retrieved from the storage cabinet is expired. The patent literature 2 explains that "the first-in-first-out method" means in a narrow sense "a system in which goods that have been stored earlier is retrieved earlier."

CITATION LIST

Patent Literature

Patent literature 1: Japanese laid-open patent publication 2014-037894

Patent literature 2: Japanese laid-open patent publication 2005-82381

SUMMARY OF THE INVENTION

Problems to be Solved by the Invention

The storage cabinet suggested in the patent literature 1 merely transmits expired goods to the external device.

The goods management system suggested in the patent literature 2 judges whether the first-in-first-out method is followed and whether goods are expired, after the goods as an item have been retrieved from the storage cabinet. However, there is a case in which goods may be expired before retrieved, and the patent literature 2 is silent in processing for that case.

In a case in which goods are expired before retrieved, a user may be requested to select one of: retrieval of expired goods to remove it from the storage cabinet; and retrieval of unexpired goods to immediately use it. In such case, it is demanded that the storage cabinet not be misused in accordance with intention of a user.

In view of the above, one of the aspects of the present invention is to provide a storage cabinet that is capable of preventing misuse by a user.

Means for Solving the Problems

The first embodiment of the present invention is a storage cabinet for storing a plurality of items, each item including a first tag attached thereto, the first tag being an RF tag for recording item information relating to a corresponding item, the item information including at least an item code identifying an item and information of an expiration date of the item, the storage cabinet including:
  a housing for storing the plurality of items;
  a door connected to the housing, the door being in an open state in which the plurality of items is accessible from the outside, or in a closed state in which the plurality of items is inaccessible from the outside;
  a first reader configured to read item information recorded in the first tag of all items stored in the housing, when the door is in the closed state;
  a judgment part configured to judge whether an expired item exists in the housing, based on a reading result of the first reader;
  a first controller configured to control item retrieval from the housing in a first mode, if the judgment part judges that an expired item does not exist in the housing, the first mode being a mode in which retrieval of an item other than an item having a period of time to an expiration date which is the shortest among items of the identical item code, is restricted; and
  a second controller configured to control item retrieval from the housing in a mode selected from the first mode and a second mode based on an operation of a user, if the judgment part judges that an expired item exist in the housing, the second mode being a mode in which retrieval of an item other than an expired item is restricted.

The storage cabinet according to the second embodiment of the present invention may further include a second reader configured to read information recorded in a second tag, when the door is in the closed state and the second tag is made proximate from the outside to a predetermined area on the housing, the information recorded in the second tag including user identification information identifying a user,
  wherein, when the second reader reads the user identification information after the judgment part has judged that an expired item exists in the housing, the second controller is configured to select the second mode.

The storage cabinet according to the third embodiment of the present invention may further include:
  a door locking part configured to lock or unlock the door, and
  a third controller configured to control the door locking part so as to unlock the door when authentication of the user identification information read by the second reader is successful.

The storage cabinet according to the fourth embodiment of the present invention may further include a first alarm part configured to output at least one of a vocal alarm and a displayed alarm, if the second controller judges:

that the first mode is selected, and an item other than an item having a period of time to an expiration date which is the shortest among items of the identical item code, has been retrieved from the storage cabinet; or that the second mode is selected, and an item other than an expired item has been retrieved from the storage cabinet.

In the storage cabinet according to the fifth embodiment of the present invention, a transmitter configured to transmit an email to a predetermined address, if the item judged to have been retrieved from the storage cabinet is not returned to the storage cabinet.

The storage cabinet according to the sixth embodiment of the present invention may further include a second alarm part configured to output at least one of a vocal alarm and a displayed alarm, when an item, a remaining period of time to an expiration date of which reaches a preset period of time, exists among the items stored in the storage cabinet.

In the storage cabinet according to the seventh embodiment of the present invention, the expiration date of an item may be an expiration date of the item itself or a preset period of time before an expiration date of the item itself.

In the storage cabinet according to the eighth embodiment of the present invention, the expiration date of an item may be a reference time.

Effects of the Invention

A storage cabinet according to the present disclosure serves to prevent misuse by a user.

BRIEF DESCRIPTION OF THE DRAWINGS

FIG. 9 shows an example of data configuration of a registered user database;

FIG. 10 shows an example of data configuration of an inventory database;

FIG. 18 shows a displayed example of the storage cabinet according to the embodiment;

FIG. 19 shows a displayed example of the storage cabinet according to the embodiment;

FIG. 20 shows a displayed example of the storage cabinet according to the embodiment.

DETAILED DESCRIPTION OF THE INVENTION

Figure 1:
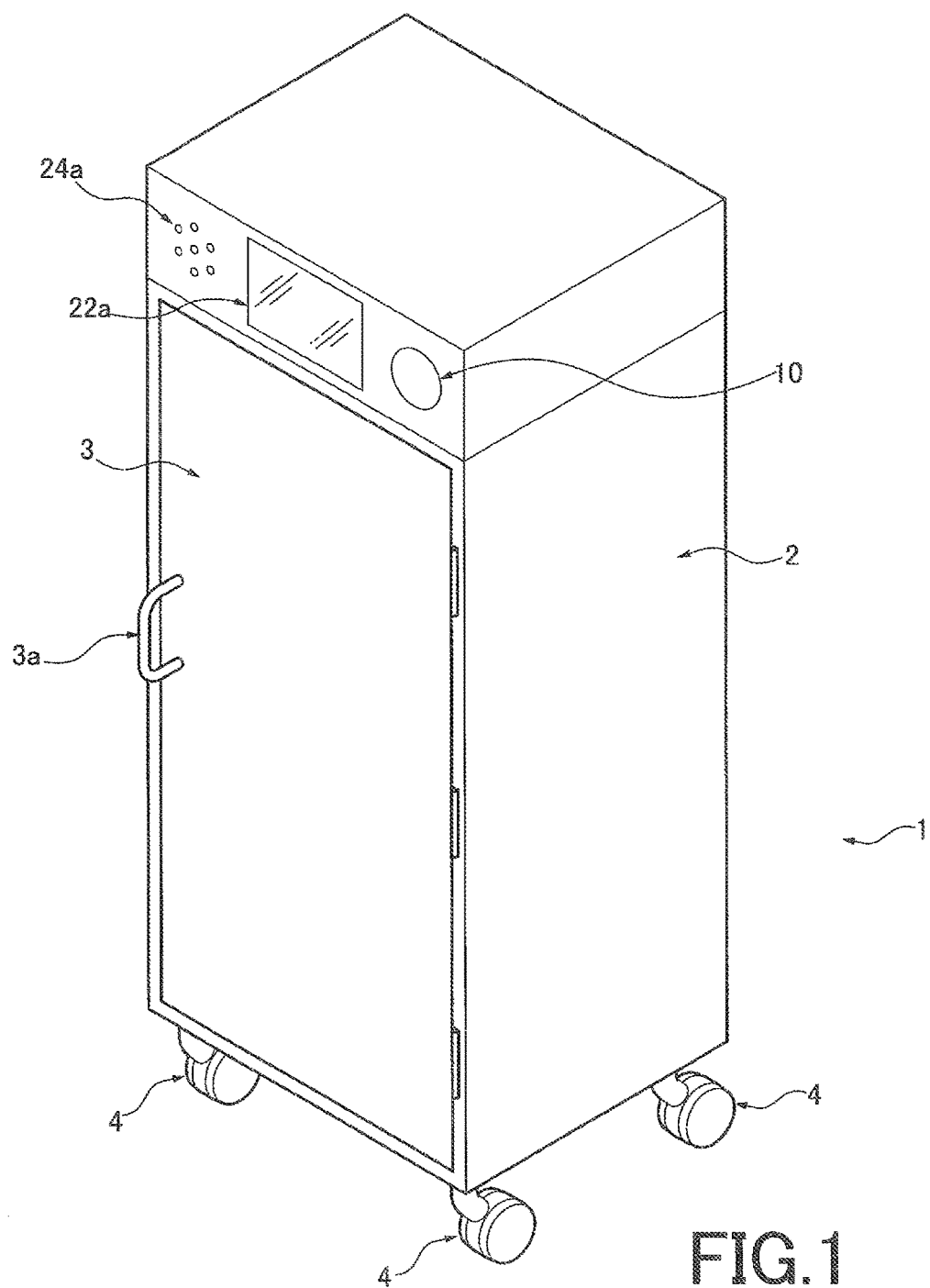
FIG. 1 shows a perspective view of a storage cabinet according to an embodiment when a door is in a closed state.

An embodiment of the present invention will be described in detail below with reference to drawings. Note that an identical sign is basically attached to the identical elements in the drawings for explaining the embodiment to avoid repeated explanation to those identical elements.

In the embodiment of the present invention, each of the first controller, the second controller, and the third controller of the present invention may be implemented with a single device or with a plurality of devices. Each of the first reader and the second reader of the present invention may be implemented with a single device or with a plurality of devices. Each of the first alarm part and the second alarm part of the present invention may be implemented with a single device or with a plurality of devices.

(1) ITEM STORAGE SYSTEM

An item storage system according to the present embodiment will be described below.

The item storage system according to the present embodiment applies: a storage cabinet for storing item(s); an item to be stored including a label attached thereto; and cards (namely, a user card UC and a picking list card PC). An RF tag is embedded in the label and each card, and an antenna radiating an electric wave to the RF tag is installed in a storage cabinet 1. The antenna and the RF tag are communicated wirelessly by use of radio frequency identification (RFID) technology. Any wireless communication type may be applied; however, a passive type RFID of phase jitter modulation (PJM) may be preferably applied in order to allow for recognition of a large amount of data with high speed.

In the following description, "an item" may be any tangible entity to be stored in a storage cabinet. For example, an item may be goods, a product, a half-finished product (that is, a product that is still being manufactured and is not a final product), or a tangible entity possessed by a person or a corporation.

In the following description, "a transaction" may be referred to as a single operation with regard to a storage cabinet by a user. For example, a transaction may be an operation of storing an item into and/or retrieval of an item from the storage cabinet, during a period of time beginning at a time when a user changes the state of the storage cabinet from a closed state to an open state and ending at a time when the use changes the state of the storage cabinet again to the closed state. An operation of that same user after changing the state of the storage cabinet again to the open state is considered as a new transaction.

(1-1) Configuration of Storage Cabinet

Figure 2:
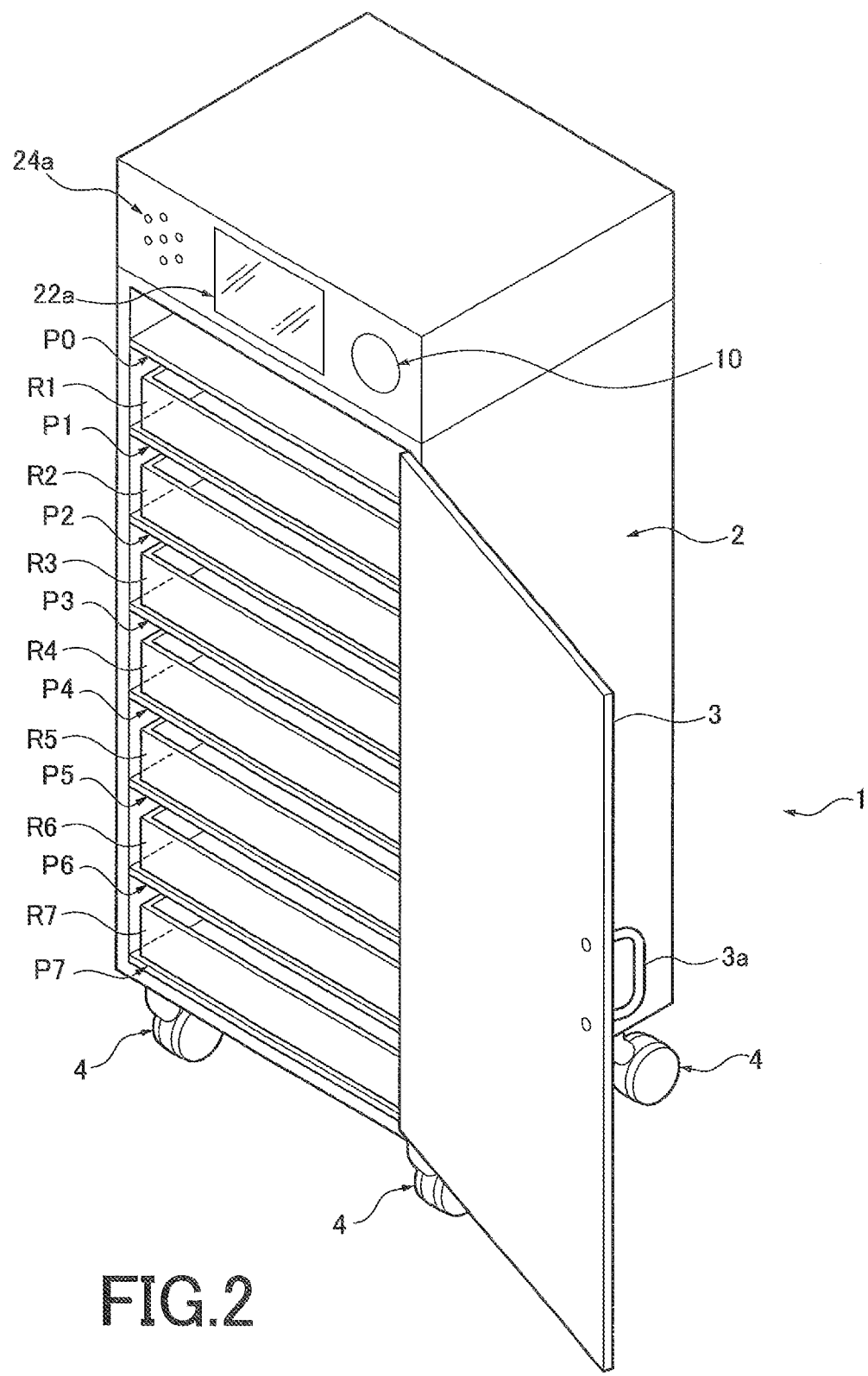
FIG. 2 shows a perspective view of the storage cabinet according to the embodiment when a door is in an open state.
Figure 3:
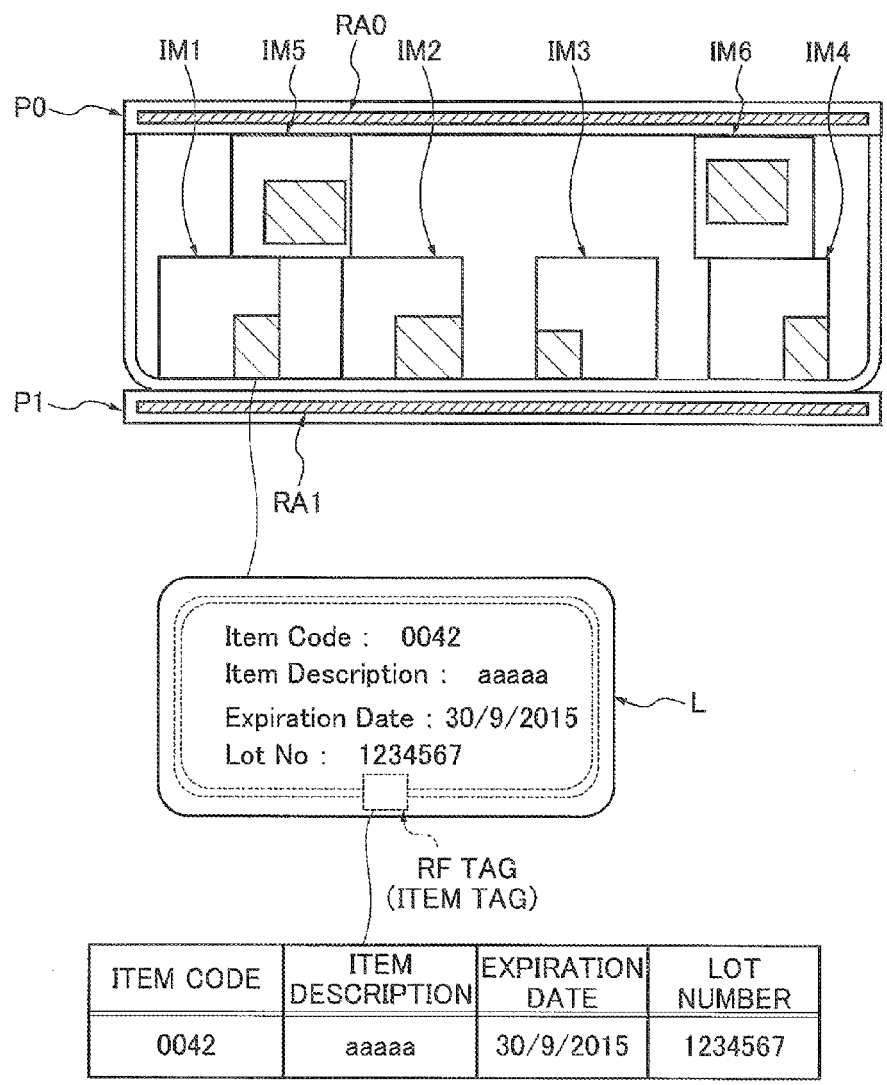
FIG. 3 shows examples of a rack in the storage cabinet according to the embodiment and items in the rack.

Firstly, a storage cabinet 1 according to the present embodiment will be described with reference to FIGS. 1 to 3. FIG. 1 shows a perspective view of a storage cabinet 1 according to the present embodiment when a door is in a closed state. FIG. 2 shows a perspective view of the storage cabinet 1 according to the present embodiment when a door is in an open state. FIG. 3 shows examples of a rack in the storage cabinet 1 according to the present embodiment and items in the rack.

As illustrated in FIGS. 1 and 2, the storage cabinet 1 includes a housing 2 so as to store a plurality of items inside. The housing 2 is basically cuboid-shaped. In FIGS. 1 and 2, wheels 4 are preferably attached at the bottom of the housing 2 so that the storage cabinet 1 is mobile; however, wheels 4 may not be provided.

The storage cabinet 1 according to the present embodiment includes a door 3 attached thereto. The door 3 is attached to the housing 2. The door 3 includes a door handle 3a attached thereto. FIG. 1 represents the door 3 in a closed state of the storage cabinet 1, to which a plurality of items inside is inaccessible from the outside. FIG. 2 represents the door 3 in an open state of the storage cabinet 1, to which a plurality of items inside is accessible from the outside. The door 3 is locked during a period of time in which there is no access to the storage cabinet 1 from a user. The door 3 is unlocked when there is an access to the storage cabinet 1 from an authorized user.

In the storage cabinet 1 according to the present embodiment, a display panel 22a, a speaker 24a, and an access antenna part 10 are disposed above the door 3.

The access antenna part 10 is a part of the front face of the housing 2, which is provided at a location on the front face of the housing 2 where an access antenna AA (not illustrated) is mounted inside of the housing 2. The location where the access antenna part 10 is provided is an example of a predetermined area on the housing 2.

The display panel 22a and the speaker 24a are disposed at the same height as a head of a user who may stand facing the door 3 so that visibility of the display panel 22a and clarity of voices from the speaker 24a are good.

As will be described later, in order for a user to retrieve an item from the storage cabinet 1 or to store an item into the storage cabinet 1, the user is required to be authorized by making a user card proximate to the access antenna part 10 (that is, by holding the user card over the access antenna part 10). At this time, since the access antenna part 10 is disposed at the same height as a head of a user who may stand facing the door 3, operability with regard to the user card is good.

In the storage cabinet 1 according to the present embodiment, the display panel 22a and the access antenna part 10 are disposed close to each other. Thus, in a case in which a user holds a card or an item over the access antenna part 10, amount of a change in a line of sight of the user is small when the user looks at a processing result displayed on the display panel 22a, and thus operability is good.

As illustrated in FIG. 2, a plurality of racks R1 to R7 (seven racks in an example of FIG. 2), which is collectively referred to as "racks R", is accumulated. Each rack is sectioned by partition plates provided at the upper and lower sides. For example, a rack R1 is disposed between a partition plate P0 and a partition plate P1, while a rack R2 is disposed between the partition plate P1 and a partition plate P2. Each partition plate includes a rack antenna inside. That is, partition plates P0 to P7 includes rack antennas RA0 to RA7 inside respectively.

Note that each rack may not be made of metal but preferably made of plastic for example so that reception performance of the rack antennas RA0 to RA7 is not deteriorated.

A cosmetic portion of the housing 2 defining appearance thereof may be preferably made of metal including an electromagnetic shielding function so that electromagnetic waves radiating from the outside do not influence on reception performance of the rack antennas. For example, such function prevents each of the rack antennas from inadvertently detecting an RF tag that is irrelevant to the storage cabinet 1 and may be proximate to or come into contact with the housing 2 from the outside of the storage cabinet 1.

Items of a variety of kinds may be stored in each rack. FIG. 3 illustrates an example of the rack R1 in which items IM1 to IM6 are stored. A label L is attached to each item. The label L (hereinafter referred to as "item tag") includes an RF tag embedded therein. Data for identifying an item is recorded in the RF tag. The item tag is an example of a first tag. Printed on a front face of each label L are: an item code, an item description, an expiration date, and a lot number of an item to which a label is attached. At least one of an item code, an item description, an expiration date, and a lot number of an item is an example of item information.

An adhesive layer is formed on a back face of each label L. Each label L is attached to a corresponding item via the adhesive layer. The label L may be produced by a printer. The printer prints information on the front face of the label L and writes data in the item tag of the label L. Note that information of an item code, an item description, an expiration date, and a lot number of an item may not be printed on each label L, and that information may not be printed at all on each label L.

Recorded in item tag embedded in each label are data (hereinafter referred to as "item data") of fields of an item code, an item description, an expiration date, and a lot number of an item, which are printed on the front face of each label L.

As described above, each partition plate includes the rack antenna transmitting radio wave to the item tag. In an example of FIG. 3, the rack antennas RA0, RA1 respectively included in the partition plates P0, P1 transmit radio waves to the item tag of all items stored in the rack R1 and receive radio waves (reflected waves) from the item tags. The radio waves from the item tags contain item data recorded in the item tag. As illustrated in FIG. 3, the item tags of the items in the rack R1 are communicated with the two rack antennas RA0, RA1 included respectively in the two partition plates P0, P1 that are provided at the upper and lower sides of the rack R1, since the item tags of the items in the rack R1 may be placed at any position.

The same applies to the other racks. For example, the rack antennas RA1, RA2 transmit radio waves from and receive radio waves to item tag(s) of item(s) in the rack R2, and the rack antennas RA2, RA3 transmit radio waves from and receive radio waves to item tag(s) of item(s) in the rack R3.

(1-2) Configuration of Cards and Method of Using Cards

Next, configuration of cards and method of using the cards in the item storage system according to the present embodiment will be described with reference to FIGS. 4 to 6.

Figure 4:
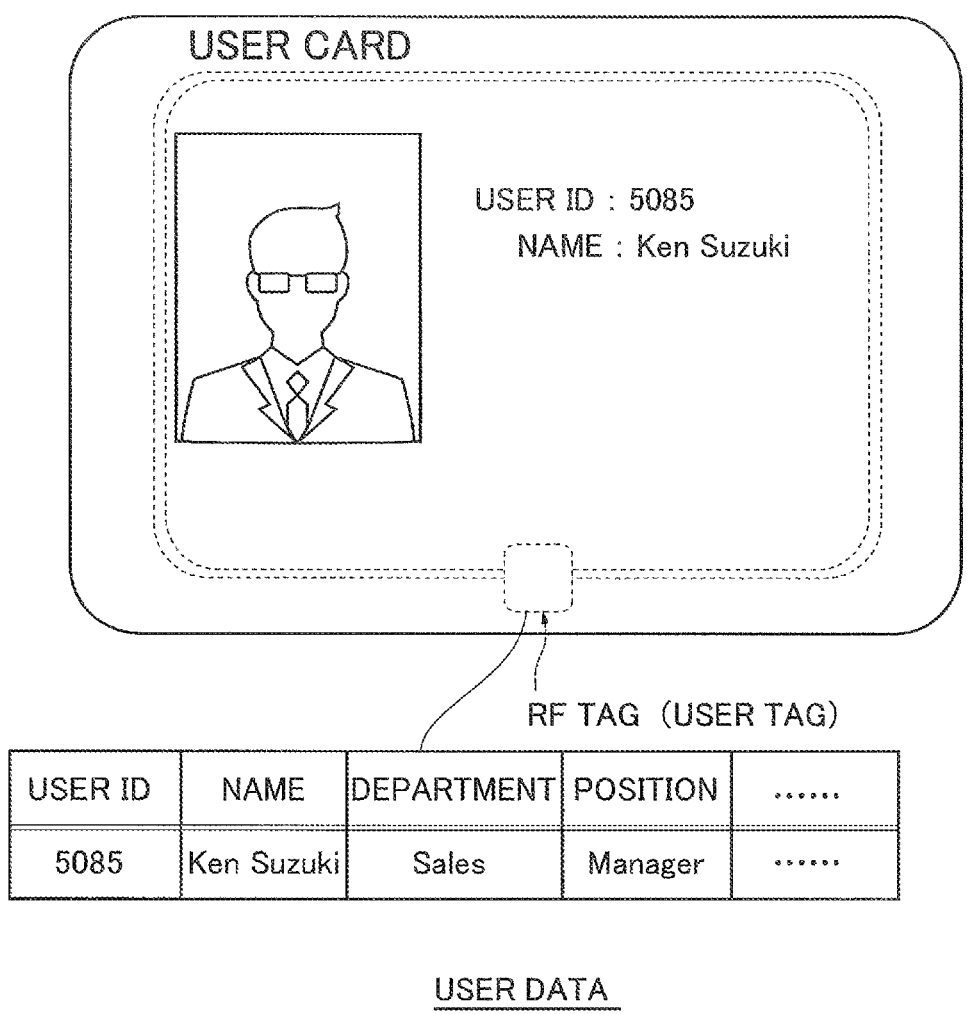
FIG. 4 shows a user card used for an item storage system according to the embodiment.

FIG. 4 shows a user card UC used for the item storage system according to the embodiment. FIG. 5 shows a picking list card PC used for the item storage system according to the embodiment. FIG. 6 shows a method for using the user card UC or the picking list card PC by a user in the item storage system according to the embodiment.

(1-2-1) User Card

A user card UC is a card for authorizing a user who is accessing the storage cabinet 1.

Information about a photograph of a user face, a user ID, and a user name are printed on a front face of the user card UC illustrated in FIG. 4 for example. An RF tag (hereinafter referred to as "user tag") is embedded in the user card UC. The user tag is an example of a second tag.

The user tag records data (hereinafter referred to as "user data") regarding a user ID, a name, a department, and a position of a user. The user ID is data used for authorization of a user using the user card ID. Data regarding a name, a department, and a position of the user are optional and thus not mandatory for authorization of the user.

Figure 6:
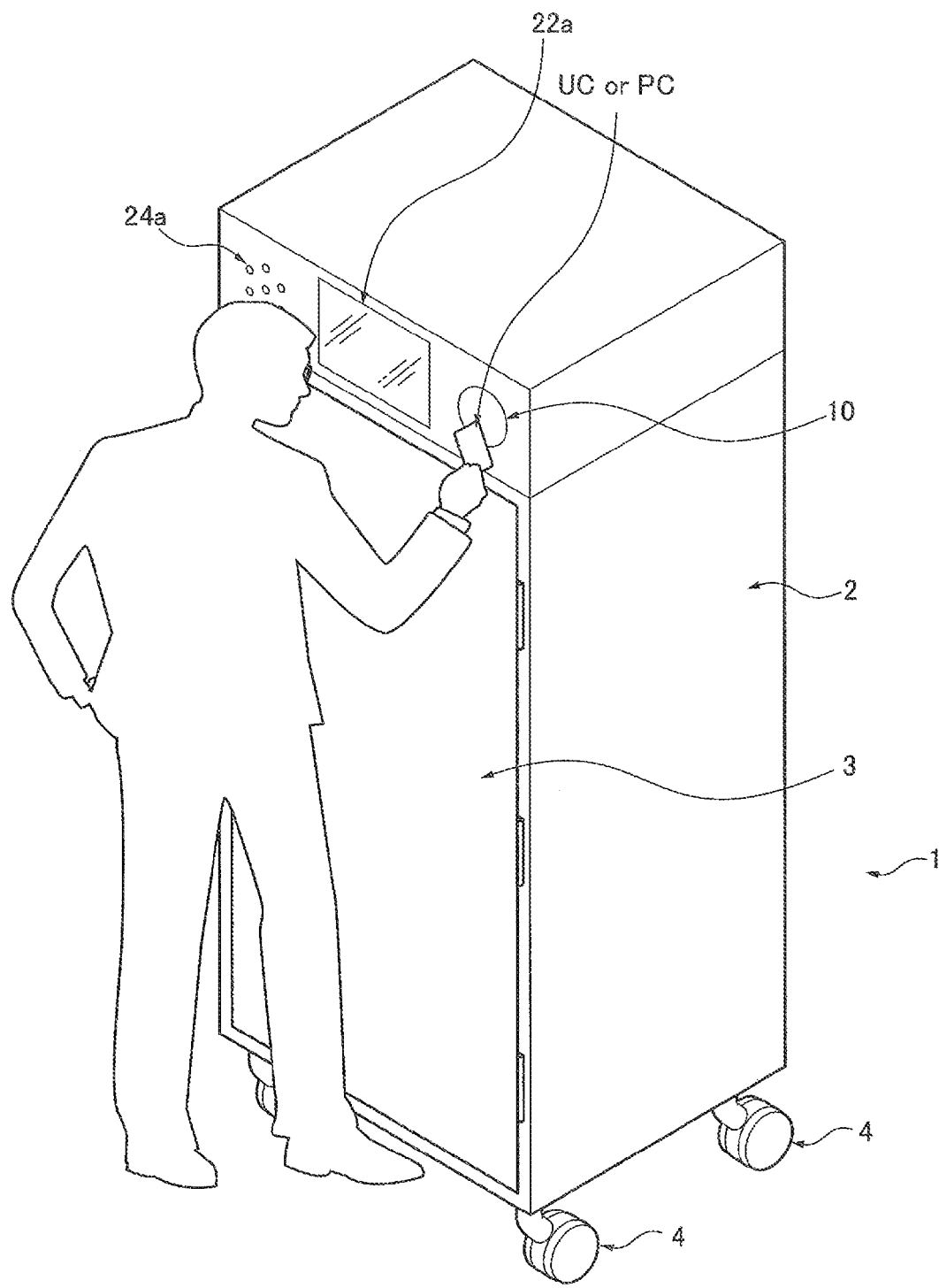
FIG. 6 shows a method for using the user card or the picking list card by a user in the item storage system according to the embodiment.

As illustrated in FIG. 6, in a case in which a user uses the user card UC, the user holds the user card UC over (that is, makes the user card UC proximate to) the access antenna part 10 of the storage cabinet 1 in order to cause the storage cabinet 1 recognize the user card UC.

Note that information regarding a user ID, a name, a department, and a position etc. of a user may not be necessarily printed on the user card UC, and that any information may not be printed on the user card UC.

(1-2-2) Picking List Card

A picking list card is a card used when a user retrieves, from the storage cabinet 1, an item which the user wishes to take out of the storage cabinet 1 (hereinafter referred to as "pick item").

Figure 5:
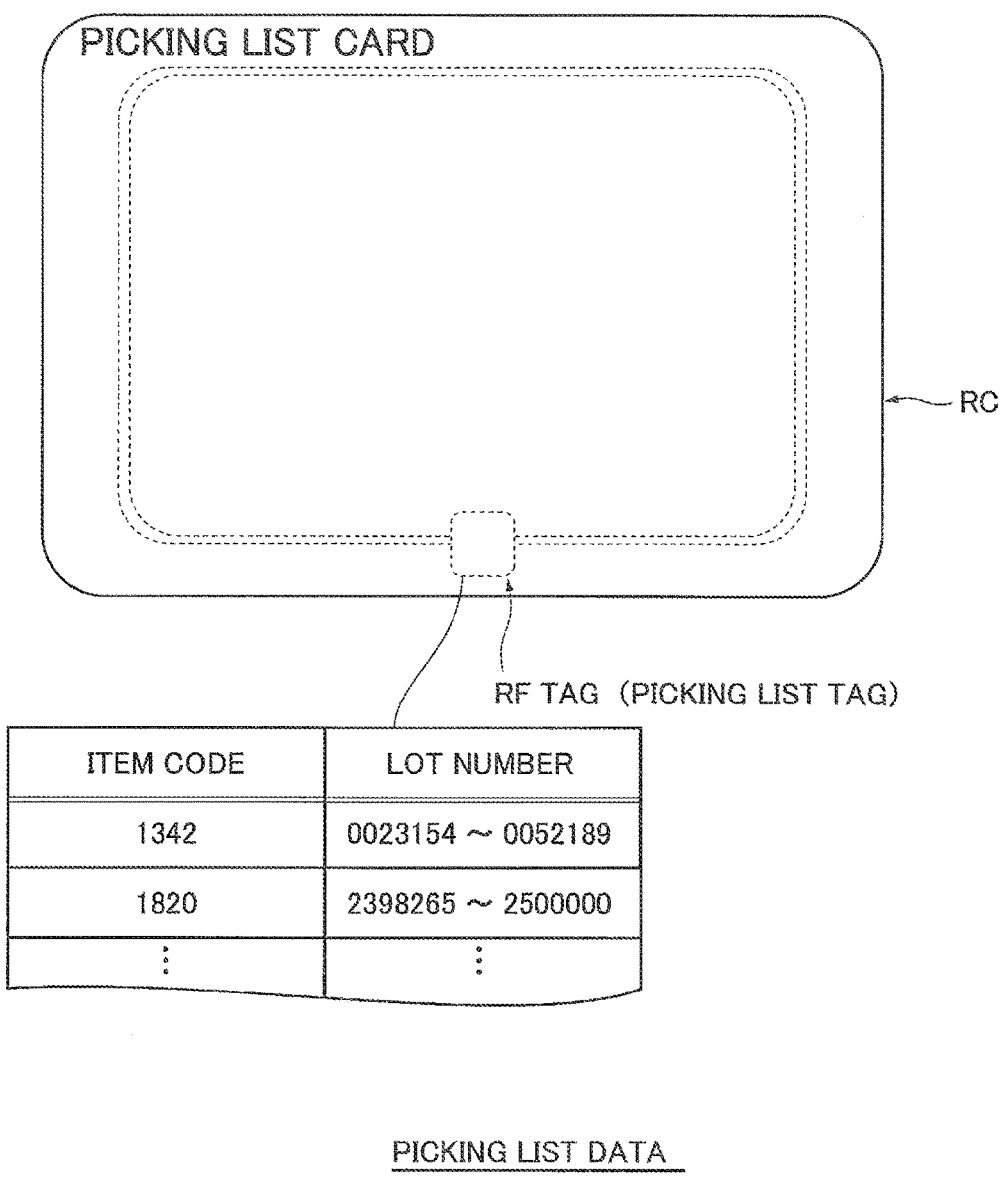
FIG. 5 shows a picking list card used for the item storage system according to the embodiment.

As illustrated in FIG. 5, an RF tag (hereinafter referred to as "picking list tag") is embedded in the picking list card PC. The picking list tag records data (hereinafter referred to as "picking list data") regarding an item code and a lot number. The item code is information for identifying an item. The lot number is data associated with a lot (unit production) when the item was manufactured. That is, the same items associated with the same lot number are proven to have been manufactured in the same lot. The pick item(s) are specified by a condition indicated in the picking list data.

As illustrated in FIG. 6, in a case in which a user uses the picking list card PC, the user holds the picking list card PC over (that is, makes the picking list card PC proximate to) the access antenna part 10 of the storage cabinet 1 in order to cause the storage cabinet 1 recognize the picking list card PC.

(1-3) Full Scanning

Next, full scanning will be described. Full scanning is processing provided for the item storage system according to the present embodiment.

"Full scanning" is processing for reading item data recorded in item tag(s) which are attached to all items stored in the storage cabinet 1. A condition of executing full scanning in the item storage system according to the present embodiment is: (i) the storage cabinet 1 has been activated, or (ii) an authorized user has changed the state of the door 3 from an open state to a closed state. The condition may be: (iii) a preset period of time has passed since the last full scanning was executed, or (v) it has reached a preset time. In such case, full scanning may be executed periodically. In a case in which there are many items stored in the storage cabinet 1, it may take as long as 20 seconds for example to complete executing full scanning.

When an authorized user changes the state of the door 3 from the open state to the closed state, it is assumed that a user operation of retrieval of an item from and/or storing an item into the storage cabinet 1 has been completed, that is, a transaction with regard to a single user access has been completed. By executing full scanning at this time, it is possible for the storage cabinet 1 to continuously recognize the latest information of item(s) stored in the storage cabinet 1.

(1-4) Pick Scanning

Figure 7:
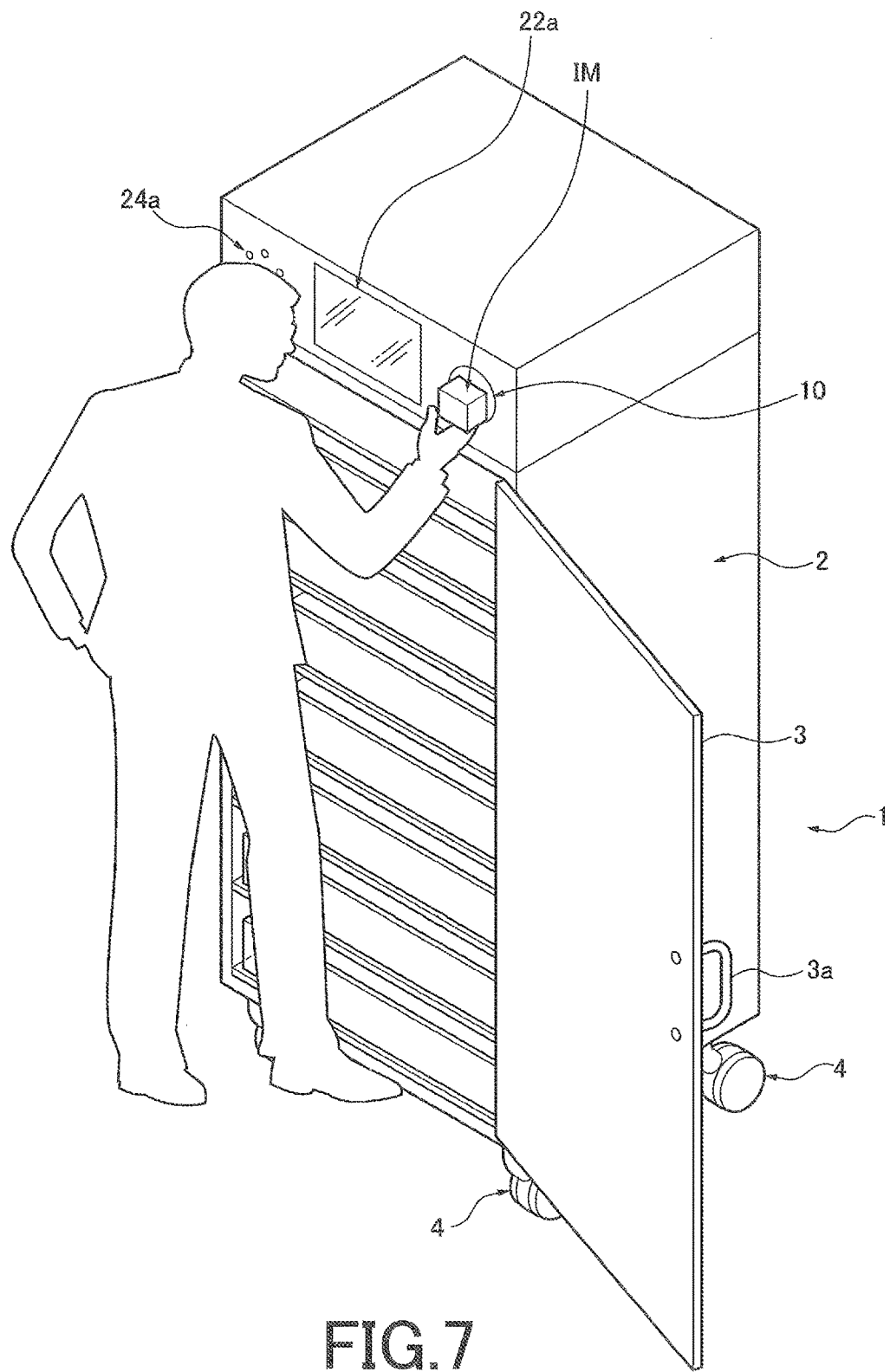
FIG. 7 shows a method for scanning an item by a user in the item storage system according to the embodiment.

Next, pick scanning will be described with reference to FIG. 7. Pick scanning is processing provided for the item storage system according to the present embodiment. FIG. 7 shows a method for scanning an item by a user in the item storage system according to the present embodiment.

The item storage system according to the present embodiment includes a function for displaying item data on the display panel 22a in a short period of time after a user holds a single item over the access antenna part 10 of the storage cabinet 1. The item data is recorded in an item tag of that item. That is, as illustrated in FIG. 7, when a user holds an item IM over (that is, makes the item IM proximate to) the access antenna part 10 of the storage cabinet 1, the user can cause the storage cabinet 1 to recognize the item IM1 and cause the display panel 22a to display a judgement result of whether the item data recorded in the item tag attached to the item IM1 is proper and whether the item IM1 is a proper item. In the following description, this function is referred to as "pick scanning."

Pick scanning is executable when the door 3 is in the open state, and contributes to good operability when a user wishes to rapidly check data regarding an item that the user is holding. Note that pick scanning may be set to be operable even when the door 3 is in the closed state.

(2) INTERNAL CONFIGURATION OF STORAGE CABINET

Figure 8:
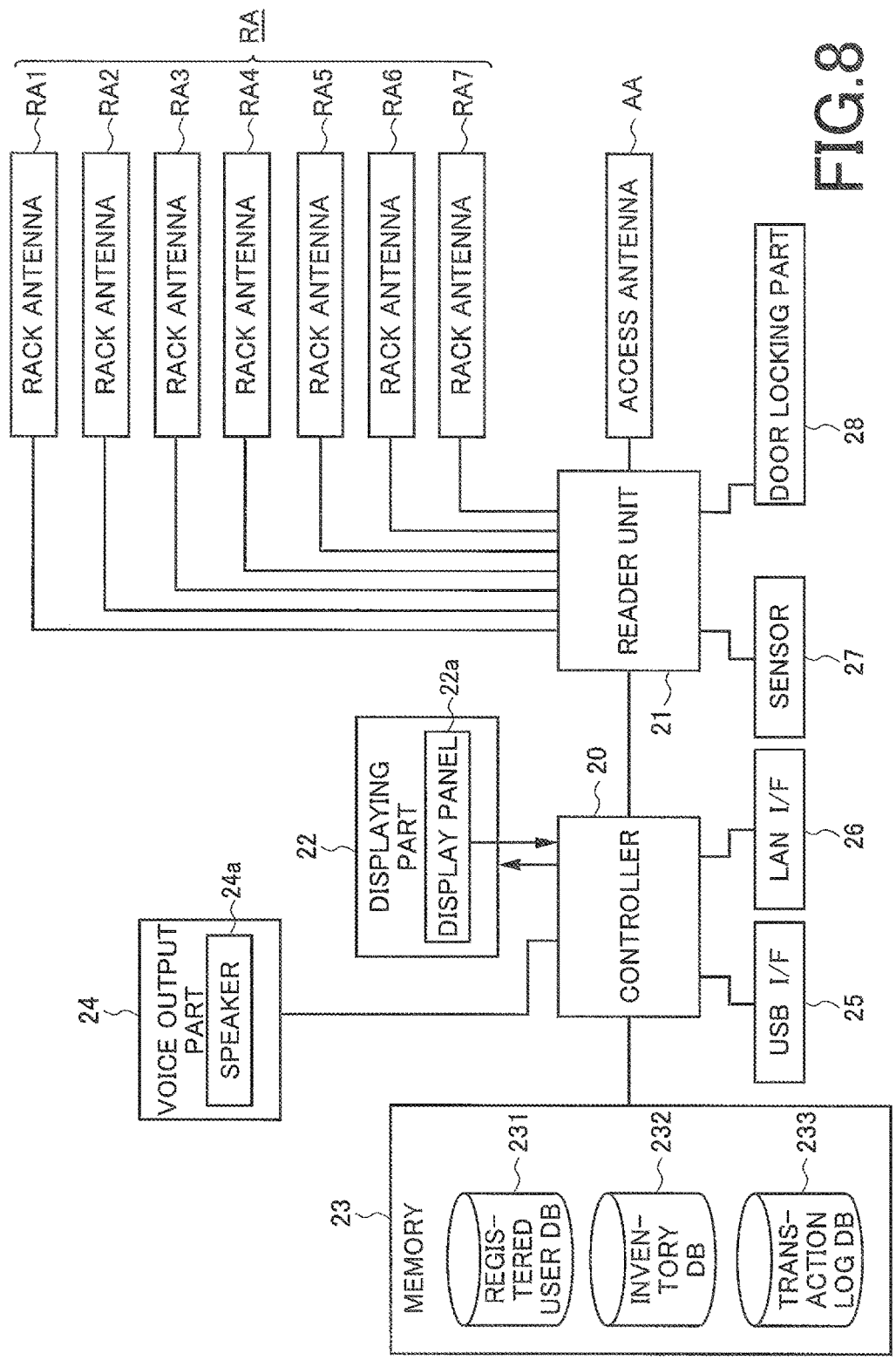
FIG. 8 is a block diagram of an internal configuration of the storage cabinet according to the embodiment.

Next, an internal configuration of the storage cabinet 1 according to the present embodiment will be described with reference to FIG. 8. FIG. 8 is a block diagram of the internal configuration of the storage cabinet according to the embodiment.

As illustrated in FIG. 8, the storage cabinet 1 according to the present embodiment includes a controller 20, a reader unit 21, a displaying part 22, a memory 23, a voice output part 24, an USB interface 25, a LAN interface 26, a sensor 27, a door locking part 28, an access antenna AA, and rack antennas RA.

The controller 20 includes a microprocessor, a read only memory (ROM), and a random access memory (RAM), as major components. The ROM records an operating system (OS) and application program(s). The microprocessor reads a program from the ROM and executes the program when the storage cabinet 1 is activated, in order to realize a variety of functions of the storage cabinet 1, which will be described later. Application programs recorded in the ROM includes an item management application program (hereinafter simply referred to as "item management application") for managing item(s) in the storage cabinet 1. The controller 20 includes a real-time clock IC to constantly measure time.

The controller 20 is an example of the first controller, the second controller, and the third controller. The first controller controls in a later-described first mode. The second controller controls in a later-described second mode.

The reader unit 21 transmits data to and receives data from the controller 20. The reader unit 21 is an example of a first reader and a second reader.

The reader unit 21 is connected to the access antenna AA. The reader unit 21 transmits a signal to the access antenna AA so that the access antenna AA radiates an electric wave. When receiving data from the access antenna AA, the reader unit 21 transmits the data (that is, data that have been read) to the controller 20. The data transmitted from the access antenna AA to the controller 20 is user data, picking list data or item data.

The reader unit 21 is connected to each of the rack antennas RA1 to RA7, namely the rack antennas RA. The reader unit 21 transmits a signal to each rack antenna so that the respective rack antennas radiates an electric wave. When receiving data from each of the rack antennas RA1 to RA7, the reader unit 21 transmits the data (that is, data that have been read) to the controller 20. The data transmitted from each of the rack antennas RA1 to RA7 is item data recorded in the item tag that is attached to the item IM stored in each of the racks R1 to R7.

Note that the controller 20 may control the reader unit 21 so that the rack antennas RA1 to RA7 operate when a predetermined condition is met. The predetermined condition may be that the storage cabinet 1 has been activated, or that the state of the door 3 has changed from the open state to the closed state, for example.

The reader unit 21 receives, from the sensor 27, data indicating whether the door 3 is in the open state or the closed state, and transmits the data to the controller 20. Further, based on a control signal from the controller 20, the reader 21 transmits, to the door locking part 28, a signal for instructing to lock or unlock the door 3.

The displaying part 22 includes a display driver circuit (not shown) and a display panel 22a. The displaying part 22 displays images on the display panel 22a based on image signals transmitted from the controller 20. The display panel 22a is a liquid crystal panel (LCD) for example. The images displayed on the display panel 22a include an image indicating a processing result based on data read by the reader unit 21 and an image indicating a variety of messages such as an error message. The displaying part 22 is an example of each of the first alarm part and the second alarm part.

In the example of the present embodiment, the display panel 22a is a touch panel that receives a touch input from a user.

The memory 23 is a non-volatile memory such as a flash memory. The memory 23 records a registered user database 231, an inventory database 232, and a transaction log database 233. The memory 23 is accessed by the controller 20 as appropriate so that each database is updated. Each data configuration of the registered user database 231, the inventory database 232, and the transaction log database 233 will be described later.

The voice output part 24 includes a signal processing circuit (not shown) and a speaker 24a. The voice output part 24 performs signal processing with regard to a voice signal transmitted from the controller 20. Then, the voice output part 24 amplifies and outputs the voice signal as a voice message from the speaker 24a. The voice output part 24 is an example of each of the first alarm part and the second alarm part.

The USB interface 25 is connected to an external device that is adapted to a wireless LAN complying with IEEE 802.11 such as WiFi (registered trademark). The USB interface 25 is provided to connect the storage cabinet 1 to the Internet or the like. For example, the storage cabinet 1 according to the present embodiment is configured to transmit an email to a manager thorough WiFi (registered trademark) when a predetermined condition is met. The USB interface 25 is an example of the transmitter.

The LAN interface 26 is configured to connect the storage cabinet 1 to an external device through a wired LAN.

The sensor 27 detects whether the door 3 is in the open state or the closed state. The sensor 27 may be an optical sensor of a thru-beam type or a reflective type for example. A detection result of the sensor 27 is sequentially transmitted from the reader unit 21 to the controller 20.

The door locking part 28 may be an electronic lock that locks and unlocks the door 3 in accordance with an instruction from the controller 20 through the reader unit 21.

(3) DATABASES MANAGED BY STORAGE CABINET

Figure 11:
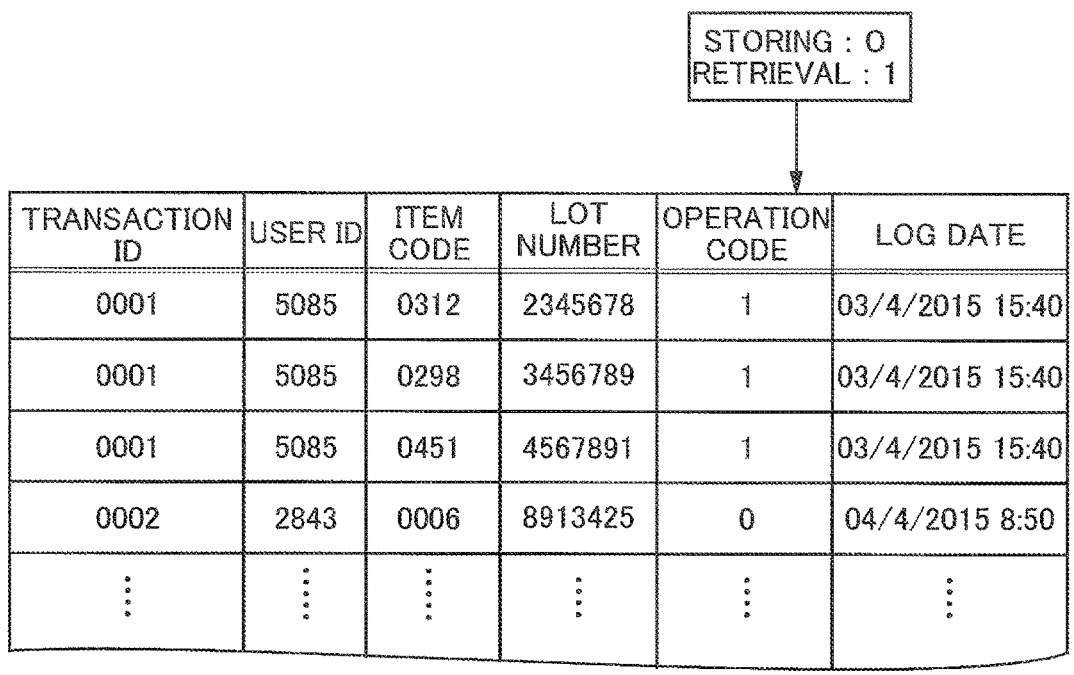
FIG. 11 shows an example of data configuration of a transaction log database.

Next, the databases referred to in the item storage system according to the present embodiment will be described with reference to FIGS. 9 to 11.

FIG. 9 shows an example of data configuration of the registered user database 231. FIG. 10 shows an example of data configuration of the inventory database 232. FIG. 11 shows an example of data configuration of the transaction log database 233.

The registered user database 231 is a database in which information of user(s) having been permitted and registered to access the inside of the storage cabinet 1 (hereinafter referred to as "registered user(s)") are recorded. In an example illustrated in FIG. 9, the registered user database 231 includes records, each of which contains data for respective fields of: a user ID, a name, a department, a position and etc. The fields provided in the registered user database 231 are the same as or a part of the fields of the user data (see FIG. 4) recorded in a user tag of the user card UC.

The registered user database 231 is used to authenticate a user who is trying to access the inside of the storage cabinet 1.

It should be noted that, in an example of the present embodiment, judgement of whether an access is permitted or not is made based on whether a user ID recorded in the user card UC is the same as any one of user ID(s) recorded in the registered user database 231; however, judgement of whether an access is permitted is not limited to this example. Alternatively, information of whether an access is permitted may be recorded in the user card UC, and such information may serve to directly judge whether the access is permitted. In such case, the registered user database 231 is not mandatory in this system.

The inventory database 232 is a database in which the latest item data (that is, the item data that has been recorded last) of all item(s) stored in the storage cabinet 1 are recorded. That is, the item data recorded in the inventory database 232 correspond to the latest result of full scanning.

In an example illustrated in FIG. 10, the inventory database 232 includes records, each of which contains data for respective fields of: an item code, an item description, a lot number, and an expiration date. The fields provided in the inventory database 232 are the same as or a part of the fields of the item data (see FIG. 3) recorded in an item tag that is attached to each item.

The inventory database 232 is used to determine a difference between item(s) stored in the storage cabinet 1 before a single transaction and those after the transaction.

The transaction log database 233 is a database in which a result of respective transaction(s) of a user is recorded in a chronological order. In an example of FIG. 11, the transaction log database 233 includes records, each of which contains data for respective fields of: a transaction ID, a user ID, an item code, a lot number, an operation code, and a log date. The transaction ID is identification data for identifying a single operation by a user, that is, identifying an operation during a period of time beginning at a time when the state of the door 3 of the storage cabinet 1 is changed from a closed state to an open state and ending at a time when the state of the door 3 is changed again to the closed state. The user ID is an ID of a user who have accessed the storage cabinet 1 in association with a transaction corresponding to the transaction ID. The item code and the lot number are data of an item corresponding to an operation code (storing: 0, retrieval: 1). The log date is a date when a transaction corresponding to the transaction ID has completed (a date when the state of the door 3 has been changed to the closed state, for example).

(4) PROCESSING EXECUTED IN ITEM STORAGE SYSTEM

Figure 12:
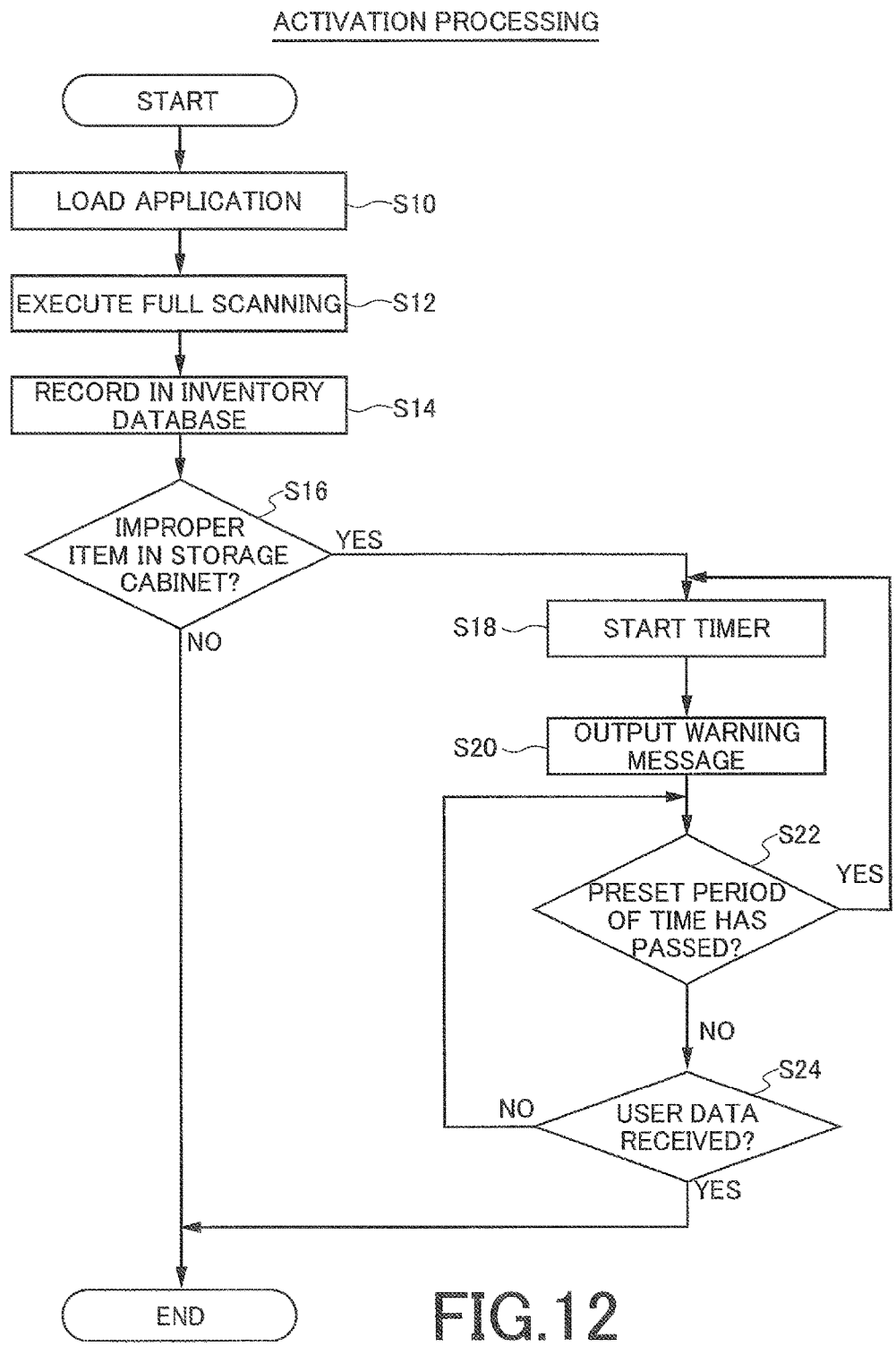
FIG. 12 shows a flowchart of activation processing of the storage cabinet according to the embodiment.
Figure 13:
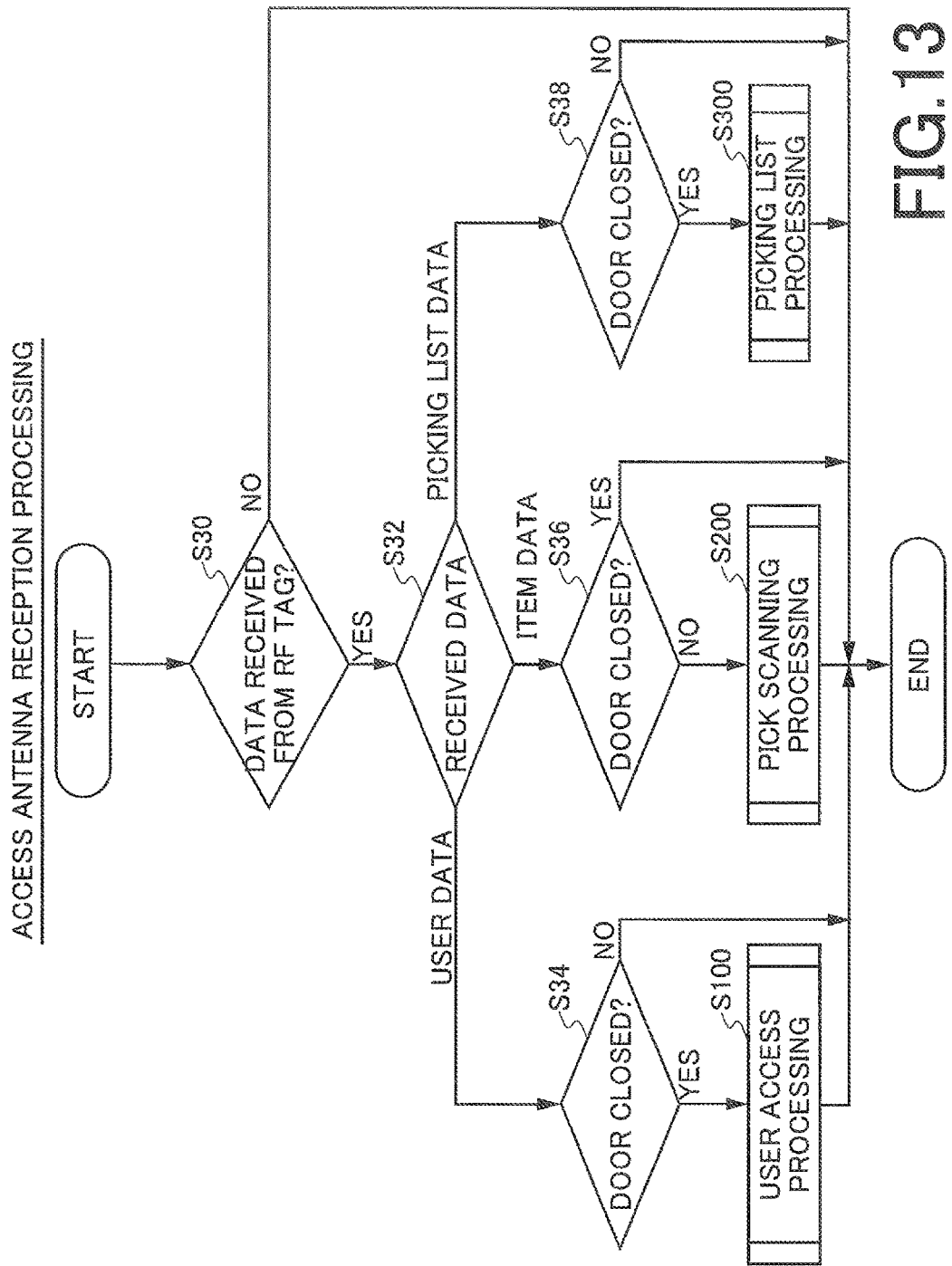
FIG. 13 shows a flowchart of access antenna reception processing of the storage cabinet according to the embodiment.
Figure 14:
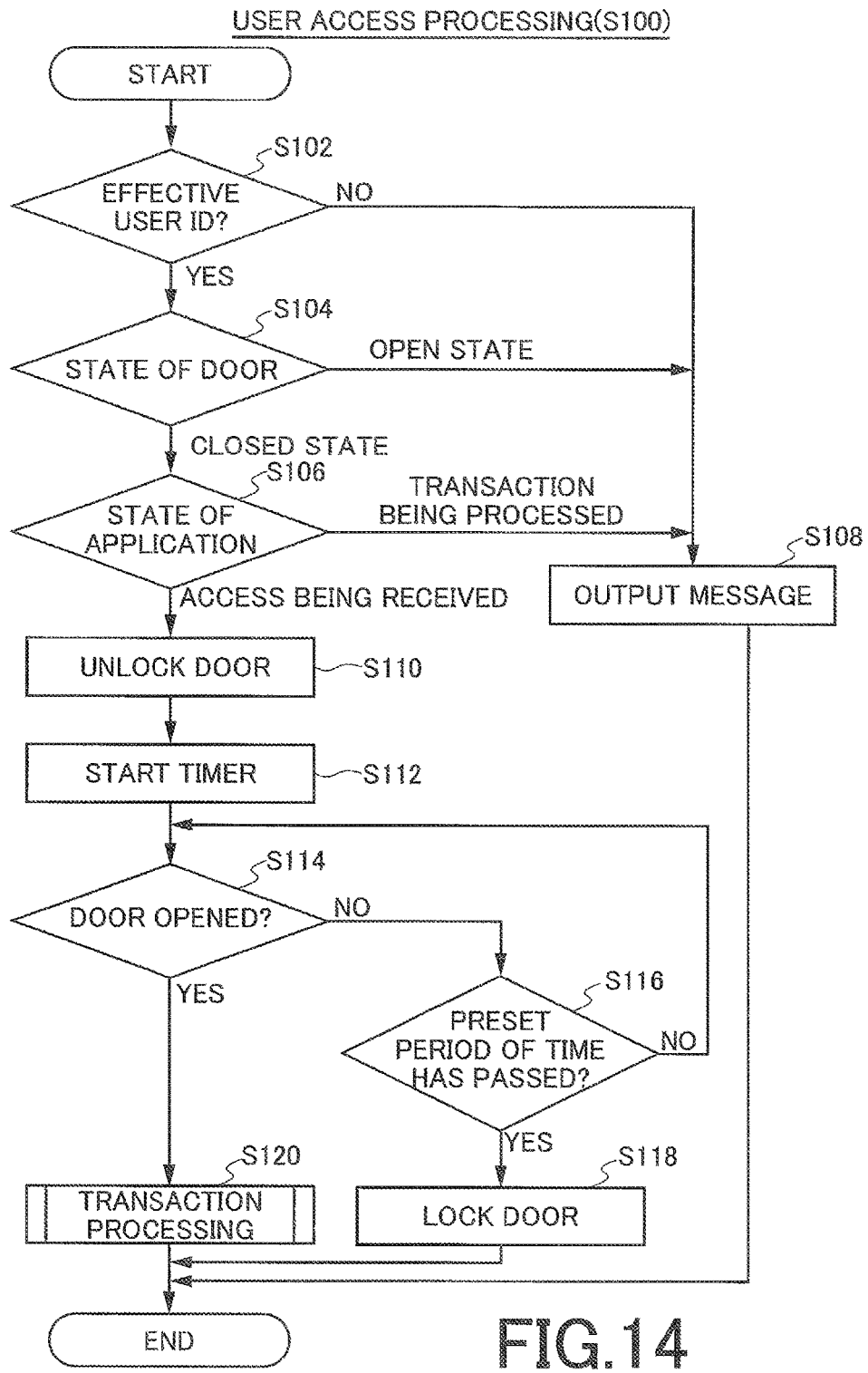
FIG. 14 shows a flowchart of user access processing of the storage cabinet according to the embodiment.
Figure 15:
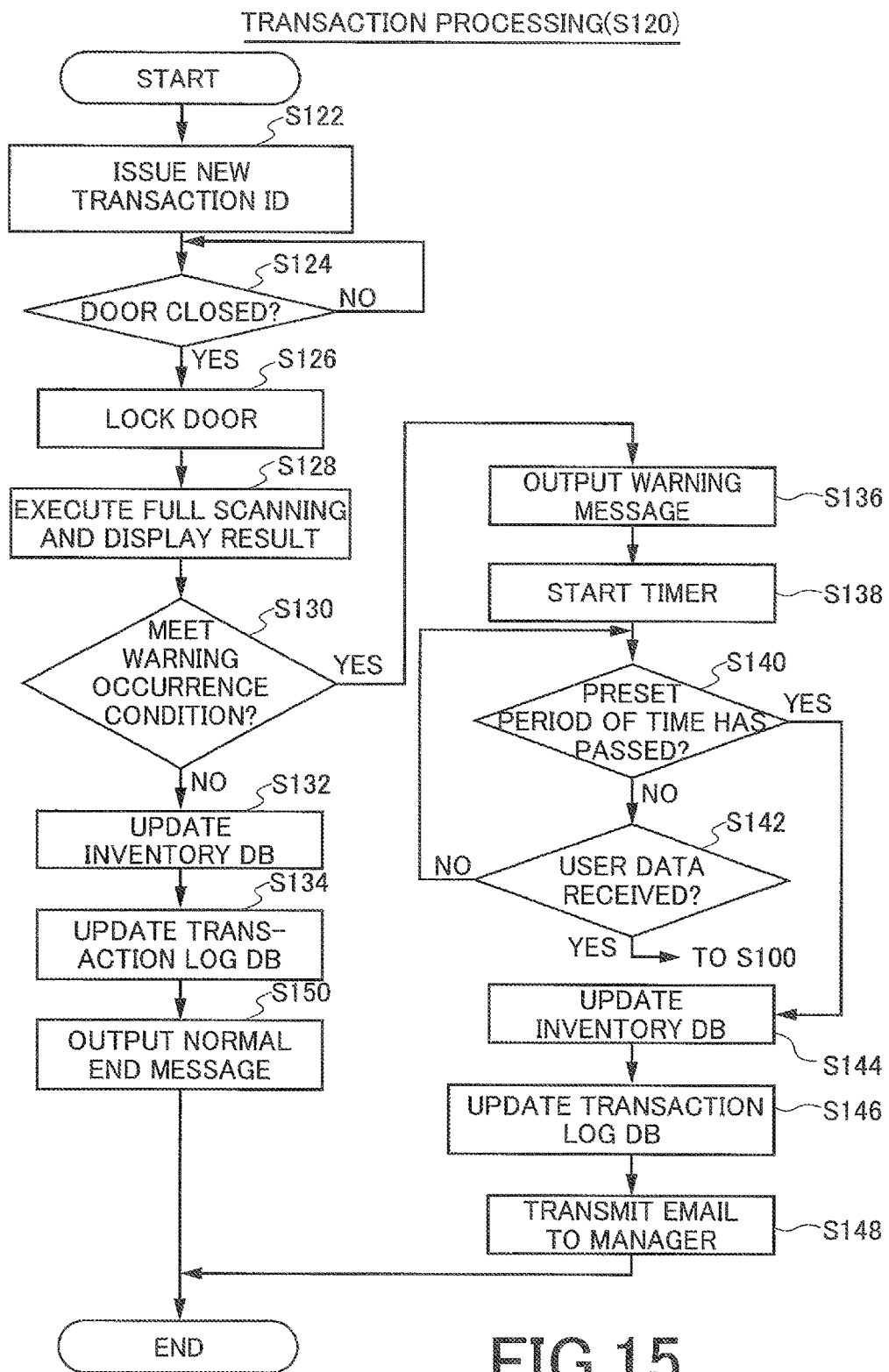
FIG. 15 shows a flowchart of transaction processing of the storage cabinet according to the embodiment.
Figure 16:
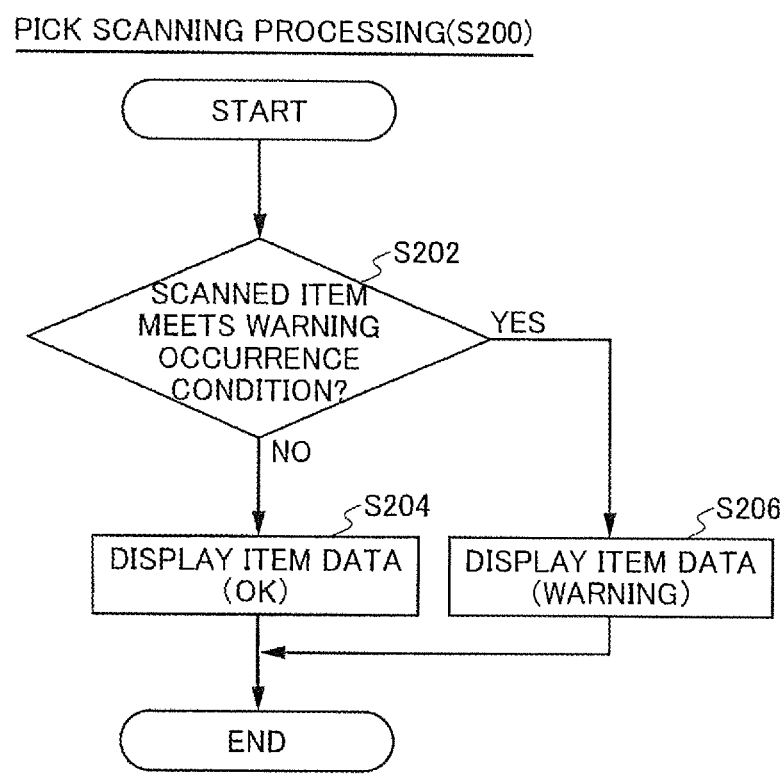
FIG. 16 shows a flowchart of pick scanning processing of the storage cabinet according to the embodiment.
Figure 17:
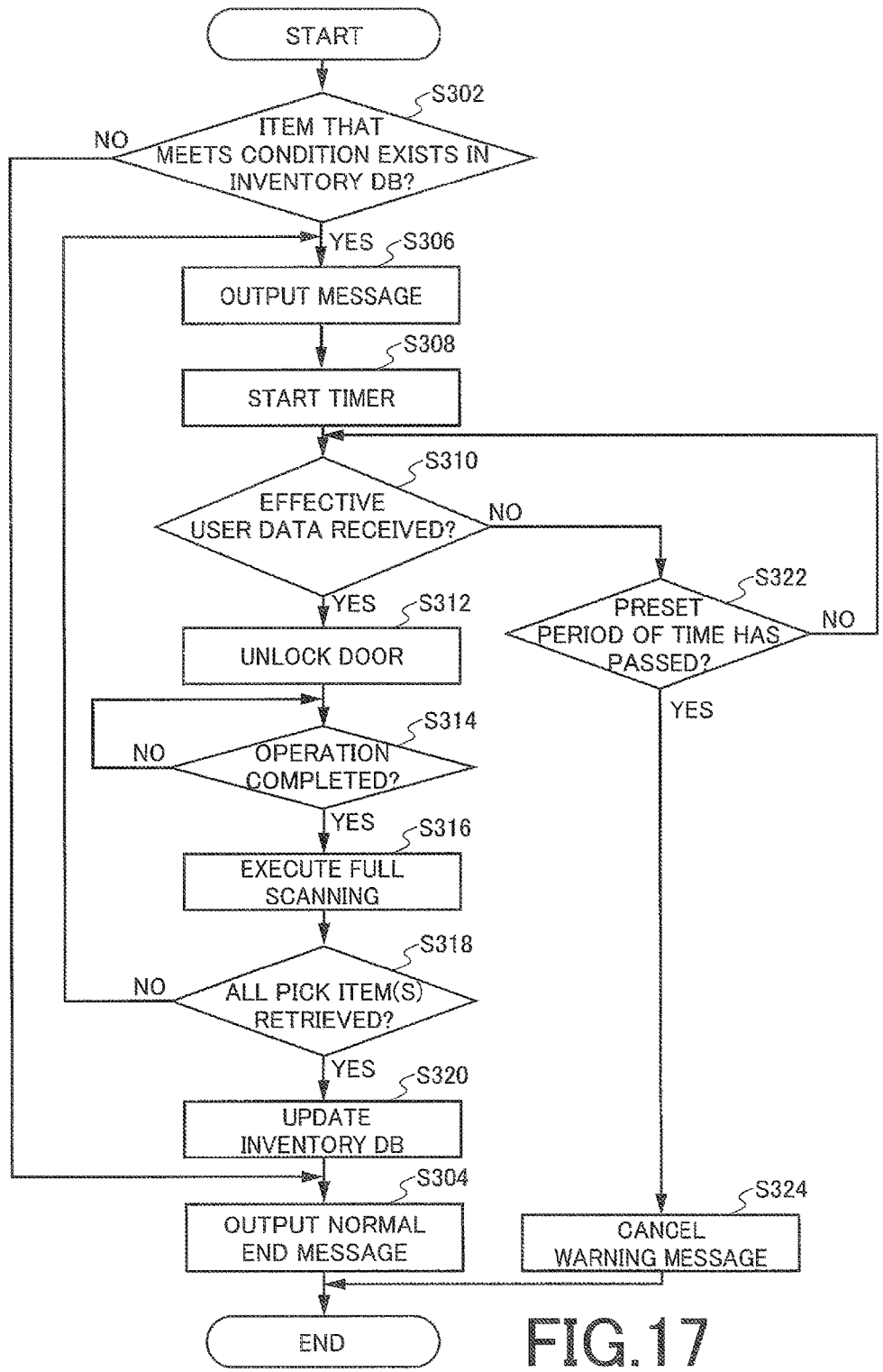
FIG. 17 shows a flowchart of picking list processing of the storage cabinet according to the embodiment.

Next, processing executed in the item storage system will be described with reference to FIGS. 12 to 19. FIG. 12 shows a flowchart of activation processing of the item storage system according to the present embodiment. FIG. 13 shows a flowchart of access antenna reception processing of the item storage system according to the present embodiment. FIG. 14 shows a flowchart of user access processing of the item storage system according to the present embodiment. FIG. 15 shows a flowchart of transaction processing of the item storage system according to the present embodiment. FIG. 17 shows a flowchart of picking list processing of the storage cabinet according to the present embodiment.

FIGS. 18 to 20 respectively show a displayed example of the storage cabinet 1 according to the present embodiment. FIG. 18 shows an execution result of full scanning. FIG. 19 shows an execution result of pick scanning. FIG. 20 shows an execution result when a picking list card is scanned.

It is not referred to in the following explanation for each processing that, when item data recorded in an item tag of an item in the storage cabinet 1 is judged as unrecognizable after the item data is read, a message indicating that the item is unrecognizable is output from the display panel 22a and/or the speaker 24a. Such message may be a text of "There is an unrecognizable item (item description: aaaaa). Please remove this item." for example. The situation of "when item data is judged as unrecognizable" may happen in a case in which a lot number is not included in the item data, a case in which the lot number is not recognized as proper data, or the like.

(4-1) Activation Processing of Item Storage System (FIG. 12)

When a power supply of the storage cabinet 1 is turned on, the controller 20 of the storage cabinet 1 starts up the OS. Then, the controller 20 reads and loads on the OS the item management application for managing item(s) in the storage cabinet 1 (S10), and executes the application. The controller 20 executes the item management application to perform the following processing.

Firstly, the controller 20 executes full scanning (S12). That is, the controller 20 reads data recorded in item tag(s) which are attached to all items stored in the storage cabinet 1, and records the data in the inventory database 232 (S14). The controller 20 then judges whether an improper item is stored in the storage cabinet 1 based on the data that have been read (S16). The improper item is, for example, an item that is past its expiration date. In such case, the judgment in S16 is made based on whether any record exists which has a value of the field of expiration date recorded which is earlier than present time, in the inventory database 232. If an improper item does not exist in the storage cabinet 1 (S16: NO), then the controller 20 terminates the activation processing.

If an improper item does exist in the storage cabinet 1 (S16: YES), then a warning voice message is output every preset period of time. More specifically, the controller 20 starts a timer (S18), and controls the voice output part 24 so that the warning voice message is output from the speaker 24a (S20). If a preset period of time has not passed (S22: NO) since the timer starts and a user holds the user card UC over the access antenna part 10, that is, user data is received within the preset period of time (S24: YES), then controller 20 terminates the activation processing and proceeds to the access antenna processing, which will be described later. If the preset period of time has passed since the timer starts without the user's holding the user card UC over the access antenna part 10 (S22: YES), the controller 20 resets and restarts the timer, and controls the voice output part 24 so that the warning voice message is output. Therefore, a warning message is output every preset period of time unless a user passes the user card UC over the access antenna part 10.

Note that, in a case in which full scanning is executed at a preset time after the storage cabinet 1 is started up, the processing S12 and thereafter in the flowchart of FIG. 12 are executed at that preset time.

(4-2) Access Antenna Processing of Item Storage System (FIG. 13)

Access antenna processing is executed when a user holds a card or an item over the access antenna part 10 of the storage cabinet 1 after the activation processing of the item storage system. Note that other processing may be interrupted to execute the access antenna processing.

If receiving data form an RF tag through the access antenna AA (S30: YES) and the received data is user data (S32: user data), the controller 20 executes user access processing (S100) when the door is in the closed state (S34: YES). Specific contents of the user access processing are shown in the flowchart of FIG. 14. When the door is in the open state, the controller 20 executes nothing (S34: NO).

If receiving data form an RF tag through the access antenna AA (S30: YES) and the received data is item data (S32: item data), the controller 20 executes pick scanning processing (S200) when the door is in the open state (S36: NO). Specific contents of the pick scanning processing are shown in the flowchart of FIG. 16. When the door is in the closed state, the controller 20 executes nothing (S36: YES).

If receiving data form an RF tag through the access antenna AA (S30: YES) and the received data is picking list data (S32: picking list data), the controller 20 executes picking list processing (S300) when the door is in the closed state (S38: YES). Specific contents of the picking list processing are shown in the flowchart of FIG. 17. When the door is in the open state, the controller 20 executes nothing (S38: NO).

(4-3) User Access Processing of Item Storage System (FIG. 14)

If the received data through the access antenna AA is user data, then the controller 20 executes authentication processing for judging whether a user ID included in the user data is effective or not (S102). In the authentication processing, the controller 20 judges whether the user ID included in the received user data is identical to any user ID in the records of the registered user database 231, and determines that the user ID included in the received user data is effective if an identical user ID exists in the registered user database 231.

If the user ID is not effective (S102: NO), then the controller 20 outputs a message notifying that the user ID is not effective, through the display panel 22a and/or the speaker 24a (S108), and terminates the user access processing.

If the user ID is effective (S102: YES), then the controller 20 judges whether the door 3 is in the open state or the closed state, based on a sensor output transmitted from the sensor 27 through the reader unit 21 (S104). If the door 3 is in the open state (S104: open state), it is assumed that other user is storing an item into the storage cabinet 1 or retrieving an item from the storage cabinet 1. Therefore, the controller 20 outputs a message such as "Please wait for a while." through the display panel 22a and/or the speaker 24a (S108), and terminates the user access processing.

Next, the controller 20 judges whether the state of the item management application is that a transaction is being processed or that an access is being received (S106). The state "a transaction is being processed" is, for example, a state in which full scanning is being executed after a user who has accessed the storage cabinet 1 last closes the door. If a user's access was permitted during a period of time in which full scanning is being processed in association with the previously-accessed user, a transaction by the previously-accessed user could not be precisely recorded in the transaction log database 233. In view of the above, the controller 20 prohibits the next user's access during a period of time in which full scanning is being processed in association with the previously-accessed user. If a transaction is being processed (S106: transaction being processed), the controller 20 outputs a message such as "Please wait for a while." through the display panel 22a and/or the speaker 24a (S108), and terminates the user access processing.

If the access is permitted, the controller 20 firstly controls the door locking part 28 through the reader unit 21 to unlock the door 3 (S110).

In an example of the present embodiment, the door 3 is configured to be locked when the door 3 is not in the open state until a preset period of time has passed since the door 3 is unlocked. More specifically, the controller 20 starts a timer (S112). If the controller 20 judges that the door 3 is not in the opened (S114: NO), the controller 20 waits until the preset period of time has passed (S116: NO). If the controller 20 judges that the door 3 is in the opened until the preset period of time has passed (S114: YES), the controller 20 executes transaction processing and then terminates the user access processing (S120). The transaction processing will be described later. If the preset period of time has passed since the timer starts without the door being in the open state (S116: YES), the controller 20 controls the door locking part 28 through the reader unit 21 to lock the door 3 (S118), and terminates the user access processing.

(4-4) Transaction Processing of Item Storage System (FIG. 15)

A flowchart of FIG. 15 shows a detailed flow of the transaction processing (S120) in FIG. 14.

In the transaction processing, a transaction ID is assigned to a period of time beginning at a time when a user of an effective user ID changes the state of the door to the open state and ending at a time when the use changes the state of the door again to the closed state, that is, a period of time in which a single transaction has been performed. A result of an operation of storing an item into and/or retrieval of an item from the storage cabinet 1 during that period of time is recorded in the transaction log database 233 in association with the transaction ID.

In the transaction processing, the controller 20 firstly issues a new transaction ID (S122). The controller 20 waits until an operation is completed by a user, that is, the door 3 is in the closed state again (S124: NO). If the door 3 is judged to be in the closed state (S124: YES), the controller 20 executes processing S126 and thereafter, judging that the transaction by the user has been completed.

The controller 20 controls the door locking part 28 through the reader unit 21 to lock the door 3 (S126), and then executes full scanning. That is, the controller 20 reads data recorded in item tag(s) which are attached to all items stored in the storage cabinet 1. The controller 20 then controls the displaying part 22 to display a result of the full scanning (S128).

An image G10 of FIG. 18 shows an example of a result of full scanning which is displayed in the display panel 22a. Displayed in this example are: a total quantity of item(s) in the storage cabinet 1, and a list of respective item(s) (an item description, an item code, and a quantity for each item). Here, after any one of item rows is tapped on the screen for example, more detailed information may be displayed with regard to the tapped item. In an example shown in FIG. 18, after an item row corresponding to the item description: aaaaa in the list of the image G10 is tapped, an image G11 will be displayed including information of an expiration date, a lot number, and a quantity, as more detailed information with regard to the item description: aaaaa.

Referring again to FIG. 15, after executing full scanning, the controller 20 judges whether any one of predetermined warning occurrence conditions is met (S130). The warning occurrence conditions includes, but not limited to, the following conditions.

[Warning Occurrence Conditions]

(Condition 1) An item having a period of time to an expiration date which is not the shortest among items of the identical item code, has been retrieved. That is, a user has retrieved an item having a later expiration date rather than one having an earlier expiration date.

(Condition 2) An expired item has been retrieved.

(Condition 3) An expired item exists in the storage cabinet 1.

(Condition 4) An item to be picked exists in the storage cabinet 1.

In order to judge whether the condition 1 or the condition 2 is met, the controller 20 compares the execution result of S128 and the inventory database 232 (that is, the latest data based on a transaction being performed).

In order to judge whether the condition 3 is met, the controller 20 compares the execution result of S128 and the present time.

A judgment of whether the condition 4 is met may be made when the RAM in the storage cabinet 1 records picking list data. That is, the judgment may be made, when a user performing a transaction or other user makes the storage cabinet 1 read picking list data included in a picking list card PC, and the storage cabinet 1 therefore records the picking list data. In this case, the controller 20 compares the picking list data and the execution result of S128 to judge whether the condition 4 is met.

If any one of the warning occurrence conditions is not met (S130: NO), the controller 20 updates the inventory database 232 (inventory DB) (S132) based on the execution result of S128, and updates the transaction log database 233 (transaction log DB) (S134). In updating the transaction log database 233, the controller 20 firstly identifies content(s) of storing and/or retrieval with regard to each item, based on a difference between data that have been recorded in the inventory database 232 immediately before S132 and the execution result of the full scanning in S128. The controller 20 then associates the identified content(s) with a user ID included in user data (see S30 in FIG. 13) that have been received, and add one or plurality of records in the transaction log database 233. After the update of the transaction log database 233 (S134) is completed, the controller 20 outputs a message notifying that the transaction has been normally completed (S150), and terminates the transaction processing.

If any one of the warning occurrence conditions is met (S130: YES), the controller 20 controls the displaying part 22 and/or the voice output part 24 so that the display panel 22a and/or the speaker 24a outputs a warning message in accordance with a warning occurrence condition (S136). The controller 20 then starts a timer (S138), and judges whether user data is received (that is, whether a user holds a user card IC over the access antenna part 10) until a preset period of time has passed (S142). If user data is not received after the preset period of time has passed (S140: YES), the controller 20 updates the inventory database 232 (inventory DB) (S144), and updates the transaction log database 233 (transaction log DB) (S146). The controller 20 then transmits an email notifying that an error has occurred in the storage cabinet 1, to a manager's address that is registered in advance (S148), and terminates the transaction processing.

On the other hand, in a case in which the user holds the user card over the access antenna part 10 within a preset period of time after the warning message is output, and user data is therefore received (S140: YES), the controller 20 executes the user access processing of FIG. 14 again. At this time, in S102, it is preferable to judge that the received user data is effective if it is identical to the user ID of the user who is performing the transaction. That is, preferably, only the user who has initiated a warning may be permitted to restart a transaction in the preset period of time and to store an item into and/or retrieve an item from the storage cabinet 1 so that a warning does not occur.

In S140, the controller 20 may proceed to S100 only when receiving effective user data. When receiving data other than the effective user data in S140, the controller 20 may not proceed to S100 but execute the same processing as a case in which any user data is not received. Here, "effective user data" is data associated with a specific corporate member of a manufacturer of an item or a supplier of an item, for example. Only an authorized user may cancel the warning, thereby carrying out proper maintenance surely with regard to the item(s) in the storage cabinet 1.

(4-5) Pick Scanning Processing of Item Storage System (FIG. 16)

When data received through the access antenna AA is item data (S30 in FIG. 13: YES; item data), the controller 20 judges, based on the item data, whether the scanned item meets any one of the following warning occurrence conditions (S202). This judgment is made by referring to item data of the scanned item or by comparing the item data and the inventory database 232.

[Warning Occurrence Conditions]

(Condition 1) An item having a period of time to an expiration date which is not the shortest among items of the identical item code, has been scanned. That is, a user has retrieved an item having a later expiration date rather than one having an earlier expiration date.

(Condition 2) An expired item has been scanned.

If the controller 20 judges that the scanned item does not meet any one of warning occurrence conditions (S202: NO), the controller 20 displays the received item data and a judgment result (OK) (S204). FIG. 19 illustrates an image G20 indicating an example of a pick scanning result. In this example, an item description, an item code, an expiration date, and a lot number, as the received item data, is displayed, and a text of "Pick scanning result: OK" is displayed as the judgment result.

If the controller 20 judges that the scanned item meets any one of the warning occurrence conditions (S202: YES), the controller 20 displays the received item data and a judgment result (WARNING) (S206).

A user holds over the access antenna part 10 an item that he or she is about to store into the storage cabinet 1 or an item that he or she is about to retrieve from the storage cabinet 1 during the transaction, and will then be able to immediately recognize whether the item is a proper one (that is, whether the item is one that does not meet any warning occurrence condition).

(4-6) Picking List Processing of Item Storage System (FIG. 17)

When data received through the access antenna AA is picking list data (S30 in FIG. 13: YES; picking list data), the controller 20 judges whether an item that meets a condition indicated by the received picking list data exists in the inventory database 232 (S302). The item that meets a condition indicated by the received picking list data is one that should be retrieved from the storage cabinet 1. When the condition indicated by the received picking list data is an item code and a lot number for example in S302, the controller 20 searches the inventory database 232 by keys as the item code and the lot number, and judges whether any item includes the identical item code and the identical lot number.

If any item that meets the condition indicated by the picking list data does not exist in the inventory database 232 (S302: NO), the controller 20 displays a normal end message (S304) and terminates the picking list processing.

If any item that meets the condition indicated by the picking list data exists in the inventory database 232 (S302: YES), processing S306 and thereafter are executed. The controller 20 firstly controls the displaying part 22 to display a predetermined message on the display panel 22a (S306), and starts a timer (S308). FIG. 20 illustrates an example of an image including the predetermined message that is displayed on the display panel 22a in S306. FIG. 20 illustrates an image G30 showing a list of items (an item description and a lot number of each item) to be retrieved from the storage cabinet 1 and a message urging a user to retrieve the items.

When, in a preset period of time (S322: NO), effective user data is received (S310: YES), the door is unlocked (S312). "Effective user data" is associated with a user authorized to retrieve (or collect) a specific item or an item that meets a specific condition, as an item to be retrieved, from the storage cabinet 1. Here, it is assumed that a user preauthorized to retrieve an item among registered users is recorded in the registered user database 231. In this case, the controller 20 searches the registered user database 231 by a key as user ID included in the received user data, and judge whether the received user data is effective or not.

If the controller 20 judges that the received user data is effective, the door is unlocked (S312), thereby allowing a user to open the door 3 and perform an operation of retrieval.

When the state of the door 3 changes from the closed state to the open state and changes again to the closed state, the controller 20 judges that the operation of retrieval has completed (S314: YES), and executes full scanning to display a result of the full scanning on the display panel 22*a* (S316). That is, the controller 20 reads data recorded in item tag(s) which are attached to all items stored in the storage cabinet 1. The controller 20 then judges whether all pick item(s) are retrieved (collected) from the storage cabinet 1 (S318).

The judgment in S318 will be made in the following fashion. That is, the controller 20 extracts item data that meets an item condition indicated by the picking list data received in S30, from item data recorded in the inventory database 232 (that is, item data indicated by an execution result of the last full scanning). In other words, the controller 20 extracts pick item(s) from item(s) in the storage cabinet 1 that have been targeted for the last full scanning. The controller 20 then judges whether the extracted pick item(s) are included in the item(s) that have been targeted for the full scanning in S316. If the pick item(s) are not included, the controller 20 judges that all pick item(s) have been retrieved. If even one pick item is included, the controller 20 judges that all pick item(s) have not been retrieved.

If the controller 20 judges that all pick item(s) have been retrieved (S318: YES), the controller 20 updates the inventory database 232 based on the execution result of the full scanning in S316 (S320), displays a normal end message (S304), and terminates the picking list processing. If the controller 20 judges that all pick item(s) have not been retrieved, the controller 20 returns to S306 (S318: NO) and outputs a warning message.

Processing of S306 to S318 are repeated until all item(s) that meet the condition indicated by the picking list data are retrieved from the storage cabinet 1. Note that, when effective user data is not received within a preset period of time after a warning message is output (S322: YES), the controller 20 cancels the warning message (S324) and returns to a normal operation. The reason why the warning message is cancelled without a user card UC held over the access antenna part 10 in the preset period of time is that there may be a case in which other user wishes to urgently retrieve an item from the storage cabinet 1.

Figure 21:
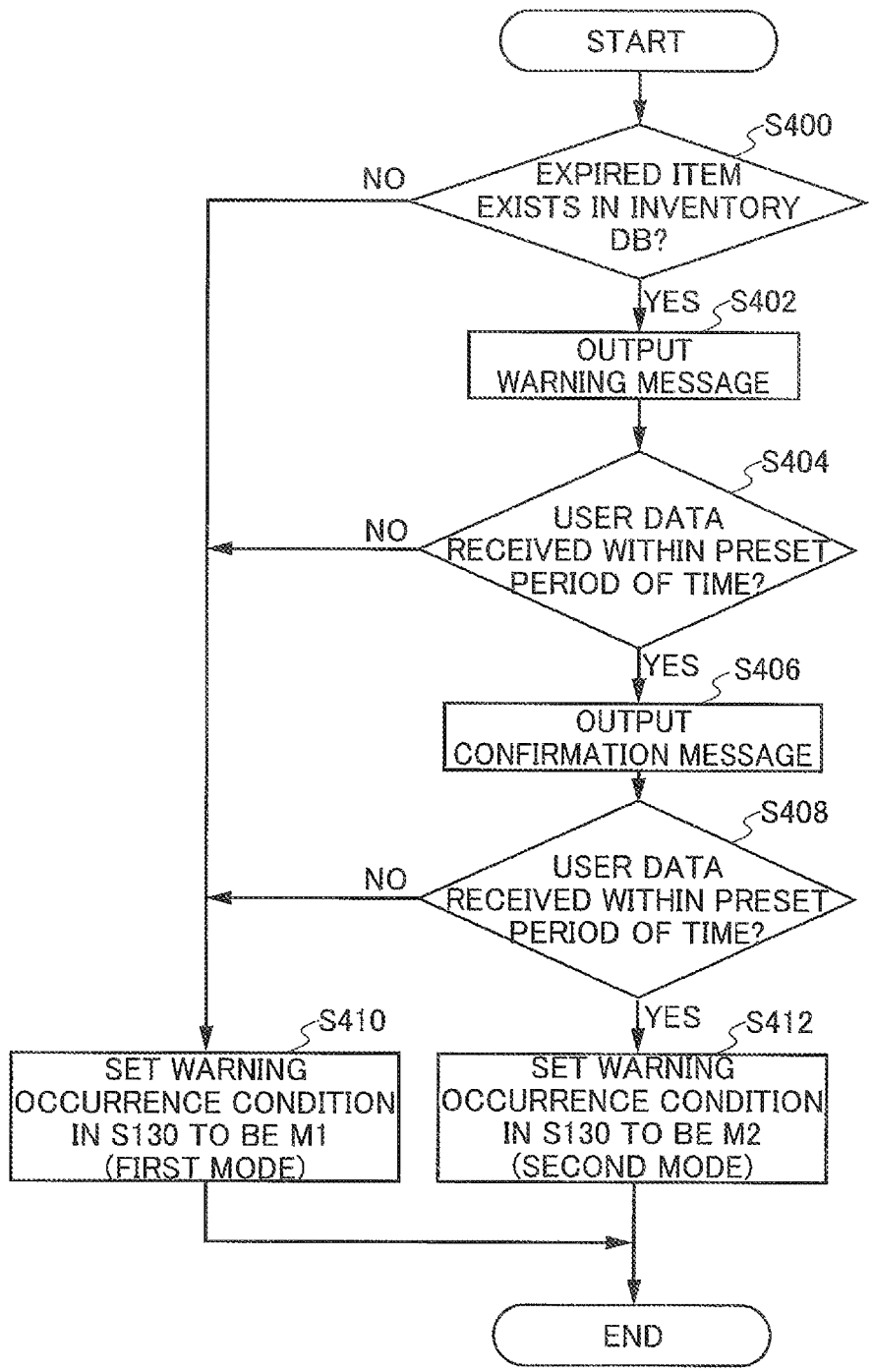
FIG. 21 is a flowchart of a method for managing an expiration date of an item in the storage cabinet according to the embodiment.

(4-7) Example of Method for Managing Expiration Date of Item in Storage Cabinet (FIG. 21)

Next, a preferable example of a method for managing an expiration date of an item in the storage cabinet 1 will be described with reference to a flowchart of FIG. 21.

In this example, a warning occurrence condition (see S130 of FIG. 15) in the transaction processing by a user is selectively determined to be a condition M1 or a condition M2 based on a judgment result, which will be described. The conditions M1 and M2 are as follow.

(Condition M1) An item other than an item having a period of time to an expiration date which is the shortest among items of the identical item code, has been retrieved from the storage cabinet 1.

(Condition M2) An item other than an expired item has been retrieved.

In the following description, a control in which a warning occurrence condition is set to be the condition M1 is referred to as "a first mode", while a control in which a warning occurrence condition is set to be the condition M2 is referred to as "a second mode."

Though an item is not expired when the item is stored (entered) into the storage cabinet 1, the item can be expired during a period of time in which the item is stored in the storage cabinet 1. Therefore, in the storage cabinet 1 according to the present embodiment, as will be described below, it is preferable to manage an expiration date of an item stored in the storage cabinet 1.

In the storage cabinet 1, the controller 20 sequentially compares a value of expiration date of each item in the inventory database 232 and the present time. If the controller 20 judges that any one of the values of expiration date does not reach the present time, that is, there is not an expired item (S400: NO), the controller 20 sets the warning occurrence condition to be the condition M1 (S410). When the warning occurrence condition is set to be the condition M1, that is the first mode, it is permitted to retrieve an item having a period of time to an expiration date which is the shortest among items of the identical item code. A warning message is output if an item other than an item having a period of time to an expiration date which is the shortest, has been retrieved. A warning message is also output if an expired item has been retrieved.

On the other hand, if the controller 20 judges that any one of the values of expiration date is identical to the present time, that is, there is an expired item (S400: YES), the controller 20 displays a warning message on the display panel 22*a* (S402). When a user holds a user card UC over the access antenna part 10, that is, the storage cabinet 1 receives user data within a preset period of time after the warning message is output (S404: YES), a confirmation message such as "Do you retrieve an expired item?" is output on the display panel 22*a* and/or from the speaker 24*a* (S406). If the controller 20 does not receive user data in S408 (S408: NO), the controller 20 sets the warning occurrence condition to be the condition M1 in S130 (see FIG. 15) (S410). If the warning occurrence condition is set to be the condition M1, that is the first mode, it is permitted to retrieve only an item having a period of time to an expiration date which is the shortest among items of the identical item code. A warning message will be output if an item other than an item having a period of time to an expiration date which is the shortest, has been retrieved. A warning message will be also output if an expired item has been retrieved.

When a user holds a user card UC over the access antenna part 10 within a preset period of time after the confirmation message is output in S406, that is, the storage cabinet 1 receives user data (S408: YES), the controller 20 recognizes that the user is about to retrieve an expired item, and determines that the warning occurrence condition in S130 (see FIG. 15) is set to be the condition M2 (S412). If the warning occurrence condition is set to be the condition M2, that is the second mode, it is permitted to retrieve an expired item only. A warning message will be output if an item other than an expired item has been retrieved. A warning message will be also output if an item other than an item having a period of time to an expiration date which is the shortest among items of the identical item code, has been retrieved. Here, the reason why the warning is output when an unexpired item has been retrieved is that the user's intention to retrieve an expired item has been already confirmed in S408.

If the storage cabinet 1 does not receive user data within the preset period of time after the confirmation message is output in S406 (S408: NO), the controller 20 sets the warning occurrence condition in S130 (see FIG. 15) to be the condition M1 (S410).

In a case in which a user holds a user card UC over the access antenna part 10 after the warning occurrence condition is set to be the condition M1, execution of the user access processing is started.

If the controller 20 judges that an item other than an item having a period of time to an expiration date which is the shortest among items of the identical item code, has been retrieved (that is, the condition M1 has been met) in the transaction processing (FIG. 15) (S130: YES), the controller 20 outputs a warning message (S136). At this time, if the controller 20 judges that the user access processing is executed again in a preset period of time (S142: YES→S100), and an item that has been retrieved most recently is stored again (that is, an item is returned to the storage cabinet 1) in the transaction processing (FIG. 15), then the controller 20 may judge that the condition is not met any longer (S130: NO). That is, whether the condition M1 is met or not in S130 is judged based on an item retrieval result during a period of time set in S140. If an item that meets the condition M1 has not been returned to the storage cabinet 1 in that period of time (S140: YES), the controller 20 controls the USB interface 25 to transmit an email to the mail address of the manager (S148).

When receiving user data in the preset period of time in S408 of FIG. 21, the controller 20 sets the warning occurrence condition to be the condition M2 and starts execution of the user access processing shown in FIG. 14.

If the controller 20 judges that an item other than an expired item has been retrieved (that is, the condition M2 has been met) in the transaction processing (FIG. 15) (S130: YES), the controller 20 outputs a warning message (S136). At this time, if the controller 20 judges that the user access processing is executed again in a preset period of time (S142: YES→S100), and an item that has been retrieved most recently is stored again (that is, an item is returned to the storage cabinet 1) in the transaction processing (FIG. 15), then the controller 20 may judge that the condition M2 is not met any longer (S130: NO). That is, whether the condition M2 is met or not in S130 is judged based on an item retrieval result during a period of time set in S140. If an item that meets the condition M2 has not been returned to the storage cabinet 1 in that period of time (S140: YES), the controller 20 controls the USB interface 25 to transmit an email to the mail address of the manager (S148).

In the example shown in the flowchart of FIG. 21, the warning occurrence condition is set to be the condition M1 in a normal case in which an expired item does not exist in the storage cabinet 1. Thus, the storage cabinet 1 is controlled so that a user retrieves earlier an item having a period of time to an expiration date which is the shortest among items of the identical item code. Accordingly, in the normal case, the storage cabinet 1 is managed so that item(s) in the storage cabinet 1 are effectively retrieved for use. Thereby, a possibility of expiration of an item can be reduced.

On the other hand, in a case in which an expired item exists in the storage cabinet 1, a user can select the condition M1 (the first mode) or the condition M2 (the second mode) as a warning occurrence condition by an operation of holding a user card UC over the access antenna part 10. Thus, the user can determine, in accordance with the user's objective, whether he or she prioritizes to remove the expired item or to retrieve an item that he or she wishes to use. Thereby, it is prevented that the user misuses the storage cabinet 1.

In the example shown in the flowchart of FIG. 21, a case is shown in which the controller 20 selects the first mode or the second mode based on whether a user holds a user card UC over the access antenna part 10 or not; however, other example is possible. Since the controller 20 recognizes the user ID in S404, the controller 20 may determine user's selection of the first mode or the second mode based on a touch operation with respect to the display panel 22a in S408. It should note that the operations with the user card in both S404 and S408 allow for a system with excellent operability.

Though not shown in the flowchart of FIG. 21, when an item, a remaining period of time to an expiration date of which reaches a preset period of time, exists in the storage cabinet 1, the controller 20 may control the displaying part 22 and/or the voice output part 24 to output alarm from the display panel 22a and/or the speaker 24a. For example, when the present time reaches three days before an expiration date of any one item of the item(s) in the storage cabinet 1, the alarm is output to inform that the expiration date of the item is approaching. In this way, a user can take a proper action with respect to the item of which expiration date is approaching, before the item is expired. Such action may be using the item with priority, for example.

In the method for managing an expiration date, a case is shown in which processing of a warning message output (S402) and a mode selection (S400) are executed with reference to an expiration date of an item; however, other example is possible. A time to be referred to in the flowchart is not limited to an expiration date of an item but may be a reference time on a basis of an expiration of an item. For example, in S400, it may be judged whether any item of which reference time has passed exists in the inventory database 232. A reference time of an item may be set as appropriate based on an expiration date of the item. For example, considering a margin, a reference time of an item may be a time two days before an expiration date of the item. A reference time of respective items in the storage cabinet 1 may be not necessarily identical but different for the respective items as appropriate. By setting a reference time for the respective items, an expiration date can be managed flexibly with respect to the respective items. A reference time as an expiration date is not necessarily a time itself, but may be a specific month, a specific day, or a combination thereof.

(5) APPLICATION OF ITEM STORAGE SYSTEM BY USER (5-1) Pick Scanning

As shown in the flowchart in FIG. 15 of the transaction processing, full scanning is executed after a user has completed storing and retrieval of item(s) (a single transaction has been completed) and close the door 3. The following is two reasons why full scanning is executed after the door 3 is closed. That is, firstly, once a user has retrieved an item from the storage cabinet 1, he or she may return the item to the storage cabinet 1 during an operation. Thus, it is impossible to precisely read item(s) in the storage cabinet 1 before the door 3 is closed and a transaction is judged to have been completed. Second, if full scanning was executed while the door 3 is opened, communication performance might be deteriorated in accordance with external radio wave environment of the housing 2.

Incidentally, execution of full scanning can take as long as 20 seconds and even longer, depending also on a total quantity of item(s) stored in the storage cabinet 1. Thus, it may take a long time from a time when a user closes the door 3 to a time when the user confirms that a transaction has been normally completed (that is, waiting time may be long), which is inconvenient for the user.

In view of the above, a user can user pick scanning to shorten or eliminate the waiting time. For example, while a user performs a transaction and the door 3 is opened, a user may hold an item that he or she is about to retrieve from the storage cabinet 1, over the access antenna part 10 (that is, perform pick scanning). In this way, the user can confirm whether he or she is about to retrieve a proper item. The user can identify item(s) that he or she has retrieved, based on an execution result of full scanning; however, if the user recognizes through pick scanning that he or she is about to retrieve a proper item, the user can close the door 3 to complete the transaction and immediately leave the storage cabinet 1 without waiting for a full scanning result. This has an advantage particularly in retrieving a small quantity of item(s).

(5-2) Picking List Card

A pick item is assumed to be retrieved from a plurality of storage cabinets 1 that are placed on a variety of locations. For example, in a case in which an item is a drug, it is required to retrieve an item that meets a specific condition from a plurality of storage cabinets 1 that are placed in a variety of hospitals. Under such circumstance, suppose that the plurality of storage cabinets 1 operates without being connected to a network. It would be cumbersome for a user to compare all items stored in respective storage cabinets 1 placed in respective hospitals, with a list noted on a paper for example, and to visually retrieve only a pick item from respective storage cabinets 1. On top of that, there would be a drawback that an operator cannot immediately recognize whether all items to be removed (that is, all items to be retrieved) have been really removed.

On the other hand, with a pick listing card according to the present embodiment, it is possible to identify pick item(s) in the storage cabinet 1 before performing an operation. Thus, if pick item(s) are not stored in the storage cabinet 1, a user does not have to search for the pick(s) in vain. Even if pick item(s) are stored in the storage cabinet 1, a user can retrieve the pick item(s) relatively easily from the storage cabinet 1, because the user already knows item(s) targeted for search. Particularly in a case in which storage cabinets 1 are placed in a variety of locations, a user, having a pick listing card only, circulates around the locations where storage cabinets 1 are placed, and can retrieve all pick item(s). That is, it is possible to surely retrieve desired item(s) in the storage cabinets.

(6) APPENDIX

In the embodiment described above, an item to be retrieved from the storage cabinet 1 in the picking list processing is not limited. That is, a condition that should be met by an item to be retrieved may be set as appropriate. For example, when a large amount of a specific kind of items is required and collected from respective storage cabinets, an item code for identifying a kind of item, as information about an item condition with regard to an item to be collected, may be initially written in an RF tag embedded in a card. In a case in which an item to be retrieved is an item to be recalled, the picking list data includes information regarding a condition with which an item to be recalled is identifiable (an item code and a lot number, for example).

The information about the item condition may be associated with any condition with which item data of item(s) in the storage cabinet 1 are searchable so that a user can retrieve the item(s). For example, the item data may include at least one of an item description, an item code, an expiration date, and a lot number of the corresponding item; the item condition may include at least one of an item description, an item code, an expiration date, and a lot number of the item.

In the embodiment described above, a condition that "an expired item exists in the storage cabinet 1" is applied as an example of a warning occurrence condition. Alternatively, a condition that "a period of time to an expiration date is shorter than a preset period of time" may be also applied. At this time, a length of the preset period of time may be determined as appropriate in accordance with an item to be stored.

In the embodiment described above, an example is shown in which full scanning is executed when the state of the door 3 is changed from the open state to the closed state (that is, the door 3 is closed); however, other example may be applied. While the state of the door 3 is the closed state, full scanning may be periodically executed, for example.

DESCRIPTION OF REFERENCE NUMERALS

1 Storage cabinet
2 Housing
3 Door
3a Door handle
4 Wheels
10 Access antenna part
20 Controller
21 Reader unit
22 Displaying part
22a Display panel
23 Memory
231 Registered user database
232 Inventory database
233 Transaction log database
24 Voice output part
24a Speaker
25 USB interface
26 LAN interface
27 Sensor
28 Door locking part
R Racks
R1 to R7 Rack
P Partition plate
RA Rack antennas
RA1 to RA7 Rack antenna
AA Access antenna
L Label
IM1 to IM6 Item
UC User card
PC Picking list card

The invention claimed is:

1. A storage cabinet for storing a plurality of items, each item including a first tag attached thereto, the first tag being an RF tag for recording item information relating to a corresponding item, the item information including at least an item code identifying an item and information of an expiration date of the item, the storage cabinet comprising:
   a housing for storing the plurality of items, the housing configured to be in a first state in which the plurality of items is accessible from the outside, or in a second state in which the plurality of items is inaccessible from the outside;
   a first reader configured to read item information recorded in the first tag of all items stored in the housing, when the housing is in the second state;
   a judgment part configured to judge whether an expired item exists in the housing, based on a reading result of the first reader;
   a first controller configured to control item retrieval from the housing in a first mode if the judgment part judges that an expired item does not exist in the housing, the first mode being a mode in which retrieval of an item other than an item having a period of time to an expiration date which is the shortest among items of the identical item code is restricted; and a second controller configured to control item retrieval from the housing in a mode selected from the first mode and a second mode based on an operation of a user if the judgment part judges that an expired item exists in the housing, the second mode being a mode in which retrieval of an item other than an expired item is restricted and retrieval of the expired item is not restricted.

2. The storage cabinet according to claim 1, further comprising a second reader configured to read information recorded in a second tag when the housing is in the second state and the second tag is made proximate from the outside to a predetermined area on the housing, the information recorded in the second tag including user identification information identifying a user, wherein, when the second reader reads the user identification information after the judgment part has judged that an expired item exists in the housing, the second controller is configured to select the second mode.

3. The storage cabinet according to claim 2, further comprising:

a door configured to be openable or closable with respect to the housing,
a door lock configured to lock or unlock the door, and
a third controller configured to control the door lock such that the door is unlocked when authentication of the user identification information read by the second reader is successful.

4. The storage cabinet according to claim 1, further comprising a first alarm configured to output at least one of a vocal alarm and a displayed alarm, if the second controller judges:

that the first mode is selected and an item other than an item having a period of time to an expiration date which is the shortest among items of the identical item code has been retrieved from the storage cabinet; or
that the second mode is selected and an item other than an expired item has been retrieved from the storage cabinet.

5. The storage cabinet according to claim 4, further comprising a transmitter configured to transmit an email to a predetermined address, if the item judged to have been retrieved from the storage cabinet is not returned to the storage cabinet.

6. The storage cabinet according to claim 1, further comprising a second alarm configured to output at least one of a vocal alarm and a displayed alarm when an item having a remaining period of time to an expiration date which reaches a preset period of time exists among the items stored in the storage cabinet.

7. The storage cabinet according to claim 1, wherein the expiration date of an item is an expiration date of the item itself or a preset period of time before an expiration date of the item itself.

8. The storage cabinet according to claim 1, wherein the expiration date of an item is a reference time.

9. The storage cabinet according to claim 1, wherein
when the operation of the user is not received, the second controller is configured to control item retrieval from the housing in the first mode, and
when the operation of the user is received, the second controller is configured to control item retrieval from the housing in the second mode.

10. The storage cabinet according to claim 9, wherein the operation of the user comprises holding a user card over an access antenna of the storage cabinet.

11. A method for storing a plurality of items in a storage cabinet, each item including a first tag attached thereto, the first tag being an RF tag for recording item information relating to a corresponding item, the item information including at least an item code identifying an item and information of an expiration date of the item, the storage cabinet being in a first state in which the plurality of items is accessible from the outside, or in a second state in which the plurality of items is inaccessible from the outside, the method comprising:

reading item information recorded in the first tag of all items stored in the storage cabinet, when the storage cabinet is in the second state;
judging whether an expired item exists in the storage cabinet, based on the result of the reading;
controlling item retrieval from the storage cabinet, if it is judged that an expired item does not exist in the storage cabinet, so that retrieval of an item other than an item having a period of time to an expiration date which is the shortest among items of the identical item code is restricted; and
controlling item retrieval from the storage cabinet, if it is judged that an expired item exists in the storage cabinet, so that, based on an operation of a user, retrieval of an item other than an item having a period of time to an expiration date which is the shortest among items of the identical item code is restricted, or retrieval of an item other than an expired item is restricted and retrieval of the expired item is not restricted.

12. The method according to claim 11, wherein
when it is judged that the expired item exists in the storage cabinet and the operation of the user is not received, controlling item retrieval from the storage cabinet comprises restricting retrieval of the item other than the item having the period of time to the expiration date which is the shortest among items of the identical item code, and
when it is judged that the expired item exists in the storage cabinet and the operation of the user is received, controlling item retrieval from the storage cabinet comprises restricting retrieval of the item other than the expired item and allowing retrieval of the expired item.

13. The method according to claim 12, wherein the operation of the user comprises holding a user card over an access antenna of the storage cabinet.

14. A storage cabinet for storing a plurality of items, each item including a first tag attached thereto, the first tag being an RF tag for recording item information relating to a corresponding item, the item information including at least an item code identifying an item and information of an expiration date of the item, the storage cabinet comprising:

a housing for storing the plurality of items, the housing configured to be in a first state in which the plurality of items is accessible from the outside, or in a second state in which the plurality of items is inaccessible from the outside;
a first reader configured to read item information recorded in the first tag of all items stored in the housing, when the housing is in the second state; and
a controller configured to:
judge whether an expired item exists in the housing, based on a reading result of the first reader;
control item retrieval from the housing in a first mode if the controller judges that an expired item does not exist in the housing, the first mode being a mode in which retrieval of an item other than an item having a period of time to an expiration date which is the shortest among items of the identical item code is restricted; and control item retrieval from the housing in a mode selected from the first mode and a second mode based on an operation of a user if the controller judges that an expired item exists in the housing, the second mode being a mode in which retrieval of an item other than an expired item is restricted and retrieval of the expired item is not restricted.

* * * * *